(12) United States Patent
Sloan et al.

(10) Patent No.: US 7,818,233 B1
(45) Date of Patent: Oct. 19, 2010

(54) USER INTERFACE FOR A FINANCIAL MODELING SYSTEM

(75) Inventors: Ronald E. Sloan, Toronto (CA); Stephen B. Slutsky, Toronto (CA)

(73) Assignee: Accenture, LLP, Chicago, IL (US)

(*) Notice: Subject to any disclaimer, the term of this patent is extended or adjusted under 35 U.S.C. 154(b) by 690 days.

(21) Appl. No.: 09/704,838

(22) Filed: Nov. 1, 2000

Related U.S. Application Data

(63) Continuation-in-part of application No. 09/579,852, filed on May 25, 2000, and a continuation-in-part of application No. 09/452,273, filed on Nov. 30, 1999, and a continuation-in-part of application No. 09/431,684, filed on Nov. 1, 1999, now abandoned.

(51) Int. Cl.
*G06Q 40/00* (2006.01)

(52) U.S. Cl. .................... 705/36 R; 705/35; 705/37; 705/38; 705/39; 713/182

(58) Field of Classification Search .................. 705/35, 705/37, 39, 36 R
See application file for complete search history.

(56) References Cited

U.S. PATENT DOCUMENTS

| | | |
|---|---|---|
| 4,455,609 A | 6/1984 | Inamura et al. |
| 4,597,046 A | 6/1986 | Musmanno et al. |
| 4,822,647 A | 4/1989 | Nozaki et al. |
| 4,896,291 A | 1/1990 | Gest et al. |
| 4,953,085 A | 8/1990 | Atkins |
| 5,077,665 A | 12/1991 | Silverman et al. |
| 5,126,936 A | 6/1992 | Champion et al. |
| 5,132,899 A | 7/1992 | Fox |
| 5,136,501 A | 8/1992 | Silverman et al. |
| 5,161,103 A | 11/1992 | Kosaka et al. |
| 5,185,696 A | 2/1993 | Yoshino et al. |
| 5,193,056 A | 3/1993 | Boes |
| 5,214,579 A * | 5/1993 | Wolfberg et al. ............. 705/36 |
| 5,222,019 A | 6/1993 | Yoshino et al. |
| 5,481,476 A | 1/1996 | Windig |

(Continued)

FOREIGN PATENT DOCUMENTS

GB   2 192 567 A   1/1988

(Continued)

OTHER PUBLICATIONS

"Sams Teach Yourself the Internet in 24 Hours," by Ned Snell, Sams Publishing, publication date Jun. 17, 1999, accesed on-line through "Safari Tech Books Online" from Proquest, accessed on-line Jul. 21, 2005.*

(Continued)

*Primary Examiner*—Kirsten S Apple
(74) *Attorney, Agent, or Firm*—Finnegan, Henderson, Farabow, Garrett & Dunner, LLP

(57) ABSTRACT

The present invention is a graphical user interface within the context of a financial planning and management system and method. The model consists of a user intention modeling module and an investment planning module. The graphical user interface displays a model and many of its related characteristics simultaneously and allows the user to interactively manipulate the model by selecting various function and mode icons. Furthermore, the user may accesses both a live advisor and an automated coach through the graphical user interface by selecting one of several communication icons.

27 Claims, 11 Drawing Sheets

U.S. PATENT DOCUMENTS

| | | | |
|---|---|---|---|
| 5,615,109 A | 3/1997 | Eder |
| 5,729,700 A | 3/1998 | Melnikoff |
| 5,745,885 A | 4/1998 | Mottola et al. |
| 5,761,442 A | 6/1998 | Barr et al. |
| 5,774,663 A | 6/1998 | Randle et al. |
| 5,774,878 A | 6/1998 | Marshall |
| 5,774,880 A | 6/1998 | Ginsberg |
| 5,774,883 A | 6/1998 | Anderson et al. |
| 5,784,696 A | 7/1998 | Melnikoff |
| 5,799,287 A | 8/1998 | Dembo |
| 5,806,048 A | 9/1998 | Kiron et al. |
| 5,806,049 A | 9/1998 | Petruzzi |
| 5,809,484 A | 9/1998 | Mottola et al. |
| 5,811,055 A | 9/1998 | Geiger |
| 5,812,988 A | 9/1998 | Sandretto |
| 5,819,237 A | 10/1998 | Garman |
| 5,819,263 A | 10/1998 | Bromley et al. |
| 5,826,250 A | 10/1998 | Trefler |
| 5,852,811 A | 12/1998 | Atkins |
| 5,857,176 A | 1/1999 | Ginsberg |
| 5,864,828 A | 1/1999 | Atkins |
| 5,870,550 A | 2/1999 | Wesinger, Jr. |
| 5,873,071 A | 2/1999 | Ferstenberg et al. |
| 5,875,437 A | 2/1999 | Atkins |
| 5,884,287 A | 3/1999 | Edesess |
| 5,893,079 A | 4/1999 | Cwenar |
| 5,903,879 A | 5/1999 | Mitchell |
| 5,911,135 A | 6/1999 | Atkins |
| 5,911,136 A | 6/1999 | Atkins |
| 5,913,202 A | 6/1999 | Motoyama |
| 5,918,217 A | 6/1999 | Maggioncalda et al. |
| 5,920,848 A | 7/1999 | Schutzer et al. |
| 5,930,762 A | 7/1999 | Masch |
| 5,930,774 A | 7/1999 | Chennault |
| 5,940,812 A | 8/1999 | Tengel et al. |
| 5,950,176 A | 9/1999 | Keiser et al. |
| 5,963,625 A | 10/1999 | Kawecki |
| 5,963,925 A | 10/1999 | Kolling et al. |
| 5,970,478 A | 10/1999 | Walker et al. |
| 5,978,778 A | 11/1999 | O'Shaughnessy |
| 5,987,433 A | 11/1999 | Crapo |
| 5,987,434 A | 11/1999 | Libman |
| 5,987,436 A | 11/1999 | Halbrook |
| 5,999,918 A | 12/1999 | Williams et al. |
| 6,003,018 A | 12/1999 | Michaud et al. |
| 6,006,201 A | 12/1999 | Berent et al. |
| 6,012,042 A | 1/2000 | Black et al. |
| 6,012,043 A | 1/2000 | Albright et al. |
| 6,012,044 A | 1/2000 | Maggioncalda et al. |
| 6,018,722 A | 1/2000 | Ray et al. |
| 6,018,768 A | 1/2000 | Ullman et al. |
| 6,021,397 A | 2/2000 | Jones et al. |
| 6,026,382 A | 2/2000 | Kalthoff |
| 6,029,153 A | 2/2000 | Bauchner et al. |
| 6,055,514 A | 4/2000 | Wren |
| 6,055,517 A | 4/2000 | Friend et al. |
| 6,058,378 A | 5/2000 | Clark et al. |
| 6,064,984 A | 5/2000 | Ferguson et al. |
| 6,064,986 A | 5/2000 | Edelman |
| 6,069,628 A * | 5/2000 | Farry et al. ............... 345/835 |
| 6,078,904 A | 6/2000 | Rebane |
| 6,081,768 A | 6/2000 | Hu |
| 6,085,175 A | 7/2000 | Gugel et al. |
| 6,112,181 A | 8/2000 | Shear et al. |
| 6,119,103 A | 9/2000 | Basch et al. |
| 6,125,355 A | 9/2000 | Bekaert et al. |
| 6,151,582 A | 11/2000 | Huang et al. |
| 6,186,793 B1 | 2/2001 | Brubaker |
| 6,195,697 B1 | 2/2001 | Bowman-Amuah |
| 6,230,197 B1 | 5/2001 | Beck et al. |
| 6,233,566 B1 | 5/2001 | Levine et al. |
| 6,236,972 B1 | 5/2001 | Shkedy |
| 6,236,975 B1 | 5/2001 | Boe et al. |
| 6,253,192 B1 | 6/2001 | Corlett et al. |
| 6,256,773 B1 | 7/2001 | Bowman-Amuah |
| 6,272,528 B1 | 8/2001 | Cullen et al. |
| 6,275,807 B1 | 8/2001 | Schirripa |
| 6,275,814 B1 | 8/2001 | Giansante et al. |
| 6,282,520 B1 | 8/2001 | Schirripa |
| 6,292,787 B1 | 9/2001 | Scott et al. |
| 6,292,827 B1 | 9/2001 | Raz |
| 6,307,958 B1 | 10/2001 | Deaton et al. |
| 6,317,726 B1 | 11/2001 | O'Shaughnessy |
| 6,324,523 B1 | 11/2001 | Killeen, Jr. |
| 6,327,586 B1 | 12/2001 | Kisiel |
| 6,332,154 B2 | 12/2001 | Beck et al. |
| 6,336,102 B1 | 1/2002 | Luskin et al. |
| 6,349,290 B1 | 2/2002 | Horowitz et al. |
| 6,360,210 B1 | 3/2002 | Wallman |
| 6,370,355 B1 | 4/2002 | Ceretta et al. |
| 6,370,508 B2 | 4/2002 | Beck et al. |
| 6,375,466 B1 | 4/2002 | Juranovic |
| 6,388,688 B1 | 5/2002 | Schileru-Key |
| 6,393,409 B2 | 5/2002 | Young et al. |
| 6,393,412 B1 | 5/2002 | Deep |
| 6,405,179 B1 | 6/2002 | Rebane |
| 6,408,225 B1 | 6/2002 | Ortmeier et al. |
| 6,418,417 B1 | 7/2002 | Corby et al. |
| 6,430,542 B1 | 8/2002 | Moran |
| 6,470,325 B1 | 10/2002 | Leemhuis |
| 6,477,447 B1 | 11/2002 | Lin |
| 6,513,069 B1 | 1/2003 | Abato et al. |
| 6,539,419 B2 | 3/2003 | Beck et al. |
| 6,564,191 B1 | 5/2003 | Reddy |
| 6,567,796 B1 | 5/2003 | Yost et al. |
| 6,574,600 B1 | 6/2003 | Fishman et al. |
| 6,601,044 B1 | 7/2003 | Wallman |
| 6,606,606 B2 | 8/2003 | Starr |
| 6,615,240 B1 * | 9/2003 | Sullivan et al. ............. 709/205 |
| 7,231,608 B1 | 6/2007 | Fano et al. |
| 7,315,837 B2 | 1/2008 | Sloan et al. |
| 7,401,040 B2 | 7/2008 | Sloan et al. |
| 2001/0032207 A1 | 10/2001 | Harley et al. |
| 2001/0039493 A1 | 11/2001 | Pustejovsky et al. |
| 2001/0044739 A1 | 11/2001 | Bensemana |
| 2002/0046074 A1 | 4/2002 | Barton |
| 2002/0087496 A1 | 7/2002 | Stirpe et al. |
| 2002/0091607 A1 | 7/2002 | Sloan et al. |
| 2002/0095363 A1 | 7/2002 | Sloan et al. |
| 2002/0099613 A1 | 7/2002 | Swart et al. |
| 2002/0111890 A1 | 8/2002 | Sloan et al. |
| 2002/0147671 A1 | 10/2002 | Sloan et al. |
| 2002/0161928 A1 | 10/2002 | Ndili |
| 2003/0144936 A1 | 7/2003 | Sloan et al. |

FOREIGN PATENT DOCUMENTS

| | | |
|---|---|---|
| GB | 2 192 567 A | 1/1998 |
| JP | 408086190 A | 4/1996 |
| JP | 100-93729 | 9/1996 |
| JP | 410093729 A | 9/1996 |
| JP | 411110447 A | 4/1999 |
| JP | 2000163030 A | 6/2000 |
| JP | 2000355290 A | 12/2000 |
| JP | 2001-209721 | 8/2001 |
| WO | WO 98/14902 | 4/1998 |
| WO | WO 98/38558 | 9/1998 |
| WO | WO 01/22253 | 3/2001 |
| WO | WO0137187 | 5/2001 |

OTHER PUBLICATIONS

Press Release, "ZY.COM: ZY.com makes creating and publishing websites simple and Free for everyone", M2 Presswire; Coventry;

Mar. 26, 1998, pp. 2, extracted on Internet on Oct. 29, 2001 from Proquest database [http://proquest.umi.com/pqdweb].

"Personal financial software", The CPA Journal, New York, Sep. 1999, vol. 69, Iss.9; p. 40, 7 pgs, Proquest, describes numbers of software packages on the market for providing automated coaching for a financial modeling.

Glenn Kennedy et al., "Web to watch CAD companies online", from CADalyst, Sep. 1, 2000.

Rob Fanjogy, "New design software connects colleagues", from Professional Builder, Mar. 1, 1999.

Ouchi et al., "Handshake telephone system to communicate with voice and force", 1997, IEEE, pp. 466-471.

Sato et al., "Measuring system for grasping", 1996, IEEE, pp. 292-297.

Karlsson et al., "A glove equipped with finger flexion sensors as command generator used in fuzzy control system", 1998, IEEE, pp. 1330-1334.

*Dayco* Statement Regarding Related Applications.

Office Action issued on Jul. 31, 2007 by US PTO on U.S. Appl. No. 09/929,610.

Office Action issued by EPO on Aug. 23, 2007 regarding summons to attend oral proceedings on Application No. 02765976.2-1238.

Office Action issued on Oct. 2, 2007 by US PTO on U.S. Appl. No. 09/927,560.

www.runmoney.com, May 2000.

Office Action issued Oct. 23, 2007 by EPO on European Application No. 02 802 758.9-2221.

Office Action issued on Oct. 31, 2007 by US PTO on U.S. Appl. No. 09/930,786.

Office Action issued on Jan. 4, 2008 by US PTO on U.S. Appl. No. 09/929,610.

Office Action issued on Feb. 6, 2008 by US PTO on U.S. Appl. No. 09/976,443.

Office Action issued on Feb. 8, 2008 by US PTO on U.S. Appl. No. 09/927,560.

Office Action issued Jan. 31, 2008 by EPO on Application No. 00959 864.0.

Office Action issued on Feb. 15, 2008 by US PTO on U.S. Appl. No. 09/930,786.

Office Action issued on Apr. 3, 2008 by US PTO on U.S. Appl. No. 09/927,560.

Office Action issued on Jul. 24, 2008 by US PTO on Application No. 09/976,443.

Office Action issued on Jul. 25, 2008 by US PTO on Application No. 09/930,786.

"GE Center for Financial Learning; Planning Tools, 'How Much Am I Spending?'" Internet Article, Online! 1999-2000. Retrieved from the Internet: www.financiallearning.com/ge/calculator.jsp?oid=9705&BV_SessionID=@@@@1126282150.1003930066@@@@&BV_EngineID=cadccfkmghkgbedcgceckh.0> on Oct. 24, 2001; 3 pgs.

Akers, Robert L., Scifinance. (data processing in the securities industry), AI Magazine, Summer, 2001.

Bacchus, F. et al. "Planning for Temporally Extended Goals" 13th International Conference on AI, Portland, OR, 1996; AAAI-96 Proceedings, pp. 1215-1222.

Bellone, R. "Forecast Your Clients' Financial Future" Accounting Technology, vol. 12, No. 3, 1996. Retrieved from the Internet: http://proquest.umi.com on Jun. 19, 2002; 6 pgs.

Booker, E. "A Think-Tank Vision" Internetweek.com, Sep. 10, 1999. Retrieved from the Internet: www.internetwk.com; 3 pgs.

Campbell, T. "Get Plugged in: Service with a :-)" Sales and Marketing Management, vol. 151, Issue 3, Mar. 1999; pp. 62-68. Retrieved from the Internet: http://proquest.umi.com on Mar. 4, 2003.

Carey, T. "Putting the Brains in Your PC" Barrons, vol. 78, Issue 49, 1998. Retrieved from the Internet: http://proquest.umi.com on Jun. 18, 2002; 4 pgs.

Chang, Kurt, Solving pattern data exchange problems: standards development revived, From Bobbin, Oct. 1, 2000.

Currin, Cliff, Financial Risk Management in Action. (petrochemicals industry), Chemical Week, Sep. 26, 2001.

Das, S. "Increasing Agent Autonomy by Learning From Events" PADD98; 2nd Int'l. Conf. on the Practical application of Knowledge Discovery and Data Mining; London, UK, 1998; pp. 241-260.

Dayco Statement Regarding Related Applications filed in U.S. Appl. No. 09/520,580 on Nov. 26, 2003.

Deb, K. "Solving Goal Programming Problems Using Multi-Objective Genetic Algorithms" Proceedings of the Congress on Evolutionary Computing, Jul. 6-9, 1999; pp. 77-84.

Epstein, E. "Converging Future" InfoWorld News, Jan. 7, 2000. Retrieved from the Internet: http://sandbox.xerox.com; 8 pgs.

European Patent Application No. 00976918.3 (Publication No. EP 1228470), Communication pursuant to Article 96(2) EPC, with Annex to the communication; Date: Oct. 24, 2002.

European Patent Application No. 00991933.3 (Publication No. EP 1228473), Communication pursuant to Article 94(3) EPC, with Annex to the communication; Date: Feb. 16, 2009.

European Patent Application No. 01927371.3 (Publication No. EP 1269386), Communication pursuant to Article 96(2), with Annex to the communication; Date: Jun. 5, 2003.

European Patent Application No. 01927371.3 (Publication No. EP 1269386), Decision to refuse a European Patent Application, with Annex to the communication; Date: Mar. 17, 2005.

European Patent Application No. 01927371.3 (Publication No. EP 1269386), Minutes of the oral proceedings before the Examining Division; Date of Proceedings: Feb. 17, 2005, Date of Minutes: Mar. 17, 2005.

European Patent Application No. 01927371.3 (Publication No. EP 1269386), Summons to attend oral proceedings, with Annex to the communication; Date: Oct. 27, 2004.

European Patent Application No. 02759326.8 (Publication No. EP 1419468), Communication pursuant to Article 96(2) EPC, with Annex to the communication; Date: Sep. 19, 2005.

European Patent Application No. 02759326.8 (Publication No. EP 1419468), Minutes of the oral proceedings before the Examining Division, with Annex to the communication; Date of Proceedings: Nov. 4, 2009, Date of Minutes: Dec. 10, 2009.

European Patent Application No. 02759326.8 (Publication No. EP 1419468), Summons to attend oral proceedings, with Annex to the communication; Date: Jan. 28, 2009.

European Patent Application No. 02765975.4 (Publication No. EP 1423772), Supplementary Search Report; Date of Mailing: Aug. 2, 2006.

European Patent Application No. 02765976.2 (Publication No. EP 1423813), Communication pursuant to Article 96(2) EPC, with Annex to the communication; Date: Feb. 10, 2005.

European Patent Application No. 02765976.2 (Publication No. EP 1423813), Communication regarding the declaration under Rule 45 EPC, with Annex to the communication; Date: Jul. 1, 2004.

European Patent Application No. 02765976.2 (Publication No. EP 1423813), Decision to refuse a European Patent application; Date: Jan. 21, 2008.

European Patent Application No. 02765976.2 (Publication No. EP 1423813), Minutes of the oral proceedings before the Examining Division, with Annexes to the communication; Date of Proceedings: Nov. 27, 2007; Date of Minutes: Jan. 21, 2008.

European Patent Application No. 02765976.2 (Publication No. EP 1423813), Result of consultation of Nov. 19, 2007 with Annex to the communication; Date: Nov. 23, 2007.

European Patent Application No. 02794694.6 (Publication No. EP 1423815), Communication pursuant to Article 96(2) EPC, with Annex to the communication; Date: Jul. 20, 2006.

European Patent Application No. 02794694.6 (Publication No. EP 1423815), Communication regarding the declaration under Rule 45 EPC, with Annex to the Communication; Date: Oct. 29, 2004.

European Patent Application No. 02802758.9 (Publication No. EP 1435033), Communication regarding the declaration under Rule 45 EPC, with Annex to the communication; Date: Mar. 27, 2006.

European Patent Application No. 02802758.9 (Publication No. EP 1435033), Minutes of the oral proceedings before the Examining Division, with Annexes to the communication; Date of Proceedings: Jun. 17, 2009, Date of Minutes: Jun. 30, 2009.

European Patent Application No. 02802758.9 (Publication No. EP 1435033), Summons to attend oral proceedings, with Annex to the communication; Date: Mar. 5, 2009.
European Patent Application No. EP 01927370.5 (Publication No. EP 1264245), Communication pursuant to Article 96(2) EPC, with Annex to the communication; Date: Aug. 6, 2007.
Fano, A.E. "A strategy-based theory of planning for goal-based scenario-learning environments" Dissertation Abstracts International, vol. 57, Issue 11-B, 1996. Retrieved from Dialog, File 35: Dissertation Abs Online, 1 pg.
Fano, A.E. "Shopper's Eye: Using Location-based filtering for a Shopping Agent in the Physical World" Proceedings of the 2nd International Conference on Autonomous Agents, May 9-13, 1998. Retrieved from Dialog, File 2: INSPEC, 2 pgs.
Fischer, D.E. et al. Security Analysis and Portfolio Management. Fifth Edition. Prentice-Hall, Inc., New Jersey, 1991; pp. 89-158.
Gapenski, Louis C., Debt-Maturity Structures Should Match Risk Preferences, (statistical data included), Healthcare Financial Management Dec. 1999.
International Patent Application No. PCT/US00/30389 (Publication No. WO 01/33467), Declaration of Non-Establishment of International Search Report Under PCT Article 17(2)(a); Date of Mailing: Sep. 18, 2001.
International Patent Application No. PCT/US00/30389 (Publication No. WO 01/33467), International Preliminary Examination Report; Date of Completion: Aug. 15, 2002.
International Patent Application No. PCT/US00/30423 (Publication No. WO 01/33402), Declaration of Non-Establishment of International Search Report Under PCT Article 17(2)(a); Date of Mailing: Nov. 5, 2001.
International Patent Application No. PCT/US00/30423 (Publication No. WO 01/33402), International Preliminary Examination Report; Date of Completion: Sep. 14, 2003.
International Patent Application No. PCT/US00/41850 (Publication No. WO 01/37187), Declaration of Non-Establishment of International Search Report Under PCT Article 17(2)(a); Date of Mailing: Feb. 5, 2002.
International Patent Application No. PCT/US00/41850 (Publication No. WO 01/37187), International Preliminary Examination Report; Date of Completion: Sep. 7, 2002.
International Patent Application No. PCT/US00/41852 (Publication No. WO 01/33474), Declaration of Non-Establishment of International Search Report Under PCT Article 17(2)(a); Date of Mailing: Sep. 25, 2001.
International Patent Application No. PCT/US00/41852 (Publication No. WO 01/33474), International Preliminary Examination Report; Date of Completion: Jul. 26, 2002.
International Patent Application No. PCT/US00/41855 (Publication No. WO 01/67334), Declaration of Non-Establishment of International Search Report Under PCT Article 17(2)(a); Date of Mailing: Aug. 23, 2001.
International Patent Application No. PCT/US00/41855 (Publication No. WO 01/67334), International Preliminary Examination Report; Date of Completion: Feb. 10, 2002.
International Patent Application No. PCT/US00/41872 (Publication No. WO 01/33476), Declaration of Non-Establishment of International Search Report Under PCT Article 17(2)(a); Date of Mailing: May 28, 2003.
International Patent Application No. PCT/US00/41872 (Publication No. WO 01/33476), International Preliminary Examination Report; Date of Completion: Apr. 8, 2005.
International Patent Application No. PCT/US01/40213 (Publication No. WO 01/65907), Declaration of Non-Establishment of International Search Report Under PCT Article 17(2)(a); Date of Mailing: Jun. 15, 2001.
International Patent Application No. PCT/US01/40213 (Publication No. WO 01/65907), International Preliminary Examination Report; Date of Completion: Oct. 16, 2003.
International Patent Application No. PCT/US01/40213 (Publication No. WO 01/65907), Written Opinion; Date of Mailing: Apr. 4, 2003.
International Patent Application No. PCT/US01/40214 (Publication No. WO 01/67340), International Preliminary Examination Report; Date of Completion: Jul. 28, 2002.
International Patent Application No. PCT/US01/40214 (Publication No. WO 01/67340), International Search Report; Date of Mailing: Nov. 9, 2001.
International Patent Application No. PCT/US02/25488 (Publication No. WO 03/17040), International Preliminary Examination Report; Date of Completion: May 19, 2004.
International Patent Application No. PCT/US02/25488 (Publication No. WO 03/17040), International Search Report; Date of Mailing: Jun. 23, 2003.
International Patent Application No. PCT/US02/25489 (Publication No. WO 03/14884), International Preliminary Examination Report; Date of Completion: Jul. 2, 2003.
International Patent Application No. PCT/US02/25489 (Publication No. WO 03/14884), International Search Report; Date of Mailing: Mar. 6, 2003.
International Patent Application No. PCT/US02/25491 (Publication No. WO 03/17041), International Preliminary Examination Report; Date of Completion: Jun. 26, 2003.
International Patent Application No. PCT/US02/25491 (Publication No. WO 03/17041), International Search Report; Date of Mailing: May 29, 2003.
International Patent Application No. PCT/US02/25492 (Publication No. WO 03/39227), International Preliminary Examination Report; Date of Completion: Nov. 2, 2003.
International Patent Application No. PCT/US02/25492 (Publication No. WO 03/39227), International Search Report; Date of Mailing: Aug. 18, 2003.
International Patent Application No. PCT/US02/25500 (Publication No. WO 03/17168), Declaration of Non-Establishment of International Search Report Under PCT Article 17(2)(a); Date of Mailing: Apr. 22, 2003.
International Patent Application No. PCT/US02/25500 (Publication No. WO 03/17168), International Preliminary Examination Report; Date of Completion: Jan. 12, 2004.
Intuit Press Release, "CNNfn.com and Intuit Announce Quicken.com on Fn, the Premier Personal Financial Resource on the Web" Dec. 2, 1997; 2 pgs.
Jaffe, L.A. "Quicken Financial Planner" Harvard Computer Review, vol. 14, No. 1, Apr. 1997.
Kleinmuntz, Don N., Measuring and managing risk improves strategic financial planning, Healthcare Financial Management, Jun. 1999.
Meahdra, M. "The ABC's of Netscape Composer" SYBEX, San Fransisco-Paris-Dusseldorf-Soest, 1997; p. 15, 66.
Mortenson, P. "Financial Planning by Computer" Best's Review (Life+/Health), vol. 85, No. 2, 1984; pp. 38, 40.
Nelson, S.L. Quicken 98 for Windows for Dummies. IDG Books Worldwide, Inc., 1998. Table of Contents, 15 pgs.
Office Action issued in U.S. Appl. No. 09/430,993; Date Mailed: Aug. 29, 2002.
Office Action issued in U.S. Appl. No. 09/431,389; Date Mailed: Nov. 7, 2001.
Office Action issued in U.S. Appl. No. 09/431,390; Date Mailed: Oct. 24, 2001 (as indicated on the USPTO file wrapper table of contents).
Office Action issued in U.S. Appl. No. 09/431,394; Date Mailed: Jul. 15, 2002.
Office Action issued in U.S. Appl. No. 09/431,417; Date Mailed: Jun. 15, 2001.
Office Action issued in U.S. Appl. No. 09/431,668; Date Mailed: May 24, 2002.
Office Action issued in U.S. Appl. No. 09/431,684, Restriction Requirement; Mail Date: Jul. 8, 2002.
Office Action issued in U.S. Appl. No. 09/431,684; Date Mailed: Sep. 9, 2002.
Office Action issued in U.S. Appl. No. 09/451,596, Restriction Requirement; Mail Date: Jun. 27, 2002.
Office Action issued in U.S. Appl. No. 09/451,667, Restriction Requirement; Mail Date: Jun. 27, 2002.
Office Action issued in U.S. Appl. No. 09/451,670; Date Mailed: Oct. 23, 2001.
Office Action issued in U.S. Appl. No. 09/451,675; Date Mailed: Aug. 2, 2002.
Office Action issued in U.S. Appl. No. 09/452,273, Restriction Requirement; Date Mailed: Jul. 23, 2002.

Office Action issued in U.S. Appl. No. 09/452,273; Date Mailed: Aug. 29, 2002.
Office Action issued in U.S. Appl. No. 09/452,276; Date Mailed: Jul. 18, 2002.
Office Action issued in U.S. Appl. No. 09/452,280; Date Mailed: Sep. 19, 2002.
Office Action issued in U.S. Appl. No. 09/520,564; Date Mailed: Apr. 14, 2003.
Office Action issued in U.S. Appl. No. 09/520,564; Date Mailed: Jul. 1, 2002.
Office Action issued in U.S. Appl. No. 09/520,580, Advisory Action; Date Mailed: Aug. 6, 2003.
Office Action issued in U.S. Appl. No. 09/520,580, Advisory Action; Date Mailed: Feb. 9, 2005.
Office Action issued in U.S. Appl. No. 09/520,580, Advisory Action; Date Mailed: Oct. 6, 2004.
Office Action issued in U.S. Appl. No. 09/520,580, Notice of Allowance; Date Mailed: Dec. 1, 2005.
Office Action issued in U.S. Appl. No. 09/520,580; Date Mailed: Dec. 4, 2003.
Office Action issued in U.S. Appl. No. 09/520,580; Date Mailed: Jul. 25, 2002.
Office Action issued in U.S. Appl. No. 09/520,580; Date Mailed: Jun. 16, 2004.
Office Action issued in U.S. Appl. No. 09/520,580; Date Mailed: Mar. 12, 2003.
Office Action issued in U.S. Appl. No. 09/520,600; Date Mailed: Sep. 26, 2002.
Office Action issued in U.S. Appl. No. 09/520,938; Date Mailed: Feb. 19, 2003.
Office Action issued in U.S. Appl. No. 09/520,940—Decision on Appeal by the Board of Patent Appeals and Interferences; Decided: Apr. 23, 2007.
Office Action issued in U.S. Appl. No. 09/520,940—Examiner's Answer before the Board of Patent Appeals and Interferences; Date Mailed: Mar. 21, 2006.
Office Action issued in U.S. Appl. No. 09/520,940, Advisory Action; Date Mailed: Jul. 12, 2004.
Office Action issued in U.S. Appl. No. 09/520,940; Date Mailed: Apr. 8, 2005.
Office Action issued in U.S. Appl. No. 09/520,940; Date Mailed: Aug. 26, 2003.
Office Action issued in U.S. Appl. No. 09/520,940; Date Mailed: Feb. 25, 2003.
Office Action issued in U.S. Appl. No. 09/520,940; Date Mailed: Jan. 30, 2004.
Office Action issued in U.S. Appl. No. 09/520,940; Date Mailed: Jun. 25, 2002.
Office Action issued in U.S. Appl. No. 09/520,940; Date Mailed: Oct. 5, 2004.
Office Action issued in U.S. Appl. No. 09/520,943; Date Mailed: Mar. 3, 2010.
Office Action issued in U.S. Appl. No. 09/520,943, Advisory Action; Date Mailed: Mar. 12, 2004.
Office Action issued in U.S. Appl. No. 09/520,943, Decision on Appeal Before the Board of Patent Appeals and Interferences, Appeal No. 2007-0868; Decided: Feb. 28, 2008.
Office Action issued in U.S. Appl. No. 09/520,943, Examiner Interview Summary; Date Mailed: Oct. 20, 2009.
Office Action issued in U.S. Appl. No. 09/520,943, Examiner Interview Summary; Date Mailed: Sep. 19, 2006.
Office Action issued in U.S. Appl. No. 09/520,943, Examiner's Answer Before the Board of Patent Appeals and Interferences; Date Mailed: Nov. 7, 2005.
Office Action issued in U.S. Appl. No. 09/520,943, Examiner's Answer Before the Board of Patent Appeals and Interferences; Date Mailed: Sep. 26, 2006.
Office Action issued in U.S. Appl. No. 09/520,943; Date Mailed: Jan. 13, 2005.
Office Action issued in U.S. Appl. No. 09/520,943; Date Mailed: Jan. 6, 2009.
Office Action issued in U.S. Appl. No. 09/520,943; Date Mailed: Jul. 14, 2008.
Office Action issued in U.S. Appl. No. 09/520,943; Date Mailed: Jul. 19, 2004.
Office Action issued in U.S. Appl. No. 09/520,943; Date Mailed: Jul. 8, 2009.
Office Action issued in U.S. Appl. No. 09/520,943; Date Mailed: Mar. 11, 2003.
Office Action issued in U.S. Appl. No. 09/520,943; Date Mailed: Nov. 18, 2003.
Office Action issued in U.S. Appl. No. 09/520,944; Date Mailed: Mar. 14, 2003.
Office Action issued in U.S. Appl. No. 09/521,470; Date Mailed: Apr. 23, 2003.
Office Action issued in U.S. Appl. No. 09/579,849; Date Mailed: Jul. 25, 2003.
Office Action issued in U.S. Appl. No. 09/579,852; Date Mailed: Mar. 25, 2003.
Office Action issued in U.S. Appl. No. 09/579,853; Date Mailed: Oct. 15, 2002.
Office Action issued in U.S. Appl. No. 09/579,854; Date Mailed: Dec. 18, 2002.
Office Action issued in U.S. Appl. No. 09/580,214; Date Mailed: Feb. 4, 2003.
Office Action issued in U.S. Appl. No. 09/580,273, Restriction Requirement; Mail Date: Sep. 8, 2003.
Office Action issued in U.S. Appl. No. 09/580,273; Date Mailed: Apr. 5, 2005.
Office Action issued in U.S. Appl. No. 09/580,276; Date Mailed: Dec. 18, 2002.
Office Action issued in U.S. Appl. No. 09/580,349; Date Mailed: Jul. 25, 2003.
Office Action issued in U.S. Appl. No. 09/580,350; Date Mailed: Jul. 24, 2003.
Office Action issued in U.S. Appl. No. 09/580,351; Date Mailed: Dec. 3, 2002.
Office Action issued in U.S. Appl. No. 09/580,352; Date Mailed: Jul. 8, 2002.
Office Action issued in U.S. Appl. No. 09/580,353; Date Mailed: Jul. 30, 2003.
Office Action issued in U.S. Appl. No. 09/580,508; Date Mailed: Jul. 15, 2003.
Office Action issued in U.S. Appl. No. 09/580,509; Date Mailed: Feb. 27, 2002.
Office Action issued in U.S. Appl. No. 09/584,165, Restriction Requirement; Mail Date: Jul. 29, 2003.
Office Action issued in U.S. Appl. No. 09/584,165; Date Mailed: Oct. 8, 2003.
Office Action issued in U.S. Appl. No. 09/927,560; Date Mailed: May 2, 2007.
Office Action issued in U.S. Appl. No. 09/927,560; Date Mailed: Aug. 25, 2006.
Office Action issued in U.S. Appl. No. 09/929,610, Notice of Allowance; Date Mailed: Apr. 5, 2010.
Office Action issued in U.S. Appl. No. 09/929,610, Examiner Interview Summary; Date Mailed: Jun. 3, 2009.
Office Action issued in U.S. Appl. No. 09/929,610; Date Mailed: Mar. 4, 2009.
Office Action issued in U.S. Appl. No. 09/929,610; Date Mailed: Mar. 21, 2007.
Office Action issued in U.S. Appl. No. 09/929,610; Date Mailed: Aug. 20, 2008.
Office Action issued in U.S. Appl. No. 09/929,610; Date Mailed: Aug. 25, 2006.
Office Action issued in U.S. Appl. No. 09/929,735, Advisory Action; Date Mailed: Sep. 14, 2005.
Office Action issued in U.S. Appl. No. 09/929,735, Examiner Interview Summary; Date Mailed: Jun. 29, 2007.
Office Action issued in U.S. Appl. No. 09/929,735, Examiner Interview Summary; Date Mailed: Nov. 22, 2004.
Office Action issued in U.S. Appl. No. 09/929,735, Notice of Allowance with Examiner Interview Summary; Date Mailed: Feb. 15, 2007.
Office Action issued in U.S. Appl. No. 09/929,735, Notice of Allowance; Date Mailed: Apr. 30, 2007.

Office Action issued in U.S. Appl. No. 09/929,735; Date Mailed: Jan. 31, 2006.
Office Action issued in U.S. Appl. No. 09/929,735; Date Mailed: Mar. 5, 2004.
Office Action issued in U.S. Appl. No. 09/929,735; Date Mailed: Mar. 17, 2003.
Office Action issued in U.S. Appl. No. 09/929,735; Date Mailed: Jun. 27, 2006.
Office Action issued in U.S. Appl. No. 09/929,735; Date Mailed: Jul. 6, 2005.
Office Action issued in U.S. Appl. No. 09/929,735; Date Mailed: Sep. 24, 2003.
Office Action issued in U.S. Appl. No. 09/929,735; Date Mailed: Oct. 19, 2004.
Office Action issued in U.S. Appl. No. 09/930,786, Notice of Allowance; Date Mailed: Feb. 19, 2010.
Office Action issued in U.S. Appl. No. 09/930,786, Notice of Allowance with Examiner Interview Summary; Date Mailed: Jun. 24, 2009.
Office Action issued in U.S. Appl. No. 09/930,786, Notice of Allowance; Date Mailed: Nov. 12, 2009.
Office Action issued in U.S. Appl. No. 09/930,786; Date Mailed: Feb. 3, 2009.
Office Action issued in U.S. Appl. No. 09/930,786; Date Mailed: Jun. 16, 2005.
Office Action issued in U.S. Appl. No. 09/930,786; Date Mailed: Jul. 27, 2004.
Office Action issued in U.S. Appl. No. 09/930,786; Date Mailed: Nov. 18, 2004.
Office Action issued in U.S. Appl. No. 09/930,786; Date Mailed: Dec. 18, 2003.
Office Action issued in U.S. Appl. No. 09/976,443, Notice of Allowance; Date Mailed: Feb. 17, 2010.
Office Action issued in U.S. Appl. No. 09/976,443, Notice of Allowance; Date Mailed: Jun. 26, 2009.
Office Action issued in U.S. Appl. No. 09/976,443, Notice of Allowance; Date Mailed: Oct. 29, 2009.
Office Action issued in U.S. Appl. No. 09/976,443; Date Mailed: Jan. 7, 2009.
Office Action issued in U.S. Appl. No. 09/976,443; Date Mailed: Mar. 24, 2006.
Office Action issued in U.S. Appl. No. 09/976,443; Date Mailed: Mar. 29, 2005.
Office Action issued in U.S. Appl. No. 09/976,443; Date Mailed: Apr. 28, 2003.
Office Action issued in U.S. Appl. No. 09/976,443; Date Mailed: Sep. 8, 2004.
Office Action issued in U.S. Appl. No. 09/976,443; Date Mailed: Oct. 4, 2005.
Office Action issued in U.S. Appl. No. 09/976,443; Date Mailed: Nov. 15, 2006.
Office Action issued in U.S. Appl. No. 09/976,443; Date Mailed: Dec. 24, 2003.
Palma-Dos-Reis, A. "Designing Personalized Intelligent Financial Decision Support Systems" Decision Support Systems, vol. 26, 1999; pp. 31-47.
Press release, "Kana and Webline Team to Provide Industry's Most Comprehensive Online Customer Interaction Solution"; Business Wire; New York; Apr. 20, 1999, pp. 1-3, extracted on Internet from http://proquest.umi.com on Mar. 4, 2003.
Press Release, "Webline Communications' Products Selected by Trimark Investments to Increase Service on financial Advis . . . Web Site"; Business Wire; Mar. 22, 1999, extracted on Internet from Dialog database on Feb. 26, 2003.
Press Release, "Webline Communications Unveils New Customer Interaction Software Suite for Enabling Interactive E-Commerce and Customer Service" Business Wire, Apr. 20, 1999; pp. 1-3.[1].
Press Release, "Webline Communications Unveils New Customer Interaction Software Suite for Enabling Interactive E-Commerce and Customer Service", Business Wire; New York; Aug. 16, 1999, pp. 1-4, extracted on Internet from http://proquest.umi.com on Mar. 4, 2003.
Probst, G. "Gerez Votre Budget Familial Sur FX—702 P" Micro-Systemes, Apr. 1983; pp. 133, 135, with English abstract.
Rachlin, R. et al. Accounting and Financial Fundamentals for Nonfinancial Executives. Rachlin, R. and Sweeny, H.W.A. (eds.), AMACOM, New York, 1972; pp. 139-143.
Reeves, J. "Growing Your Practice Beyond Financial Planning: The CPA as Investment Adviser" CPA Journal, Sep. 1998; pp. 46-52.
Texas Instruments TI-89 Advanced Graphing Calculator, from http://www.amazon.com, hard-copy printed Mar. 18, 2003.
TI-89 and Voyage™ 200PLT product guide, and TI-89/92 Plus Graphing Calculator Tasks, these are evidents of commercial uses (copyright 1995-2003).
Villegas, D. Whip! Your AutoCAD drawings, From CADalyst, Feb. 1, 1998.
Waldron, H.C. "The Game of Life" Limra's Marketfacts, vol. 16, Issue 5, Sep./Oct. 1997. Retrieved from the Internet: http://proquest.umi.com on Jun. 17, 2002; 5 pgs.
Waller, K.M. "Filling the Knowledge Gap" Journal of Accountancy, vol. 187, Issue 4, 1999. Retrieved from the Internet: http://proquest.umi.com on Jun. 21, 2002; 5 pgs.
Weverka, P. Microsoft Money 98 for Dummies. IDG Books Worldwide, Inc., Foster City, CA, 1997; pp. 21-29, 59-79, 149-161, and 207-229.
Williams, D.C. "Automating a Financial Planning Service" ABA Banking Journal, vol. 77, No. 10, 1985; pp. 82-84.
Office Action issued in U.S. Appl. No. 09/930,786, Notice of Allowance; Date Mailed: Apr. 19, 2010.
Office Action issued in U.S. Appl. No. 09/976,443, Notice of Allowance; Date Mailed: Apr. 19, 2010.
Office Action issued in U.S. Appl. No. 09/929,610, Notice of Allowability; Date Mailed: May 26, 2010.

* cited by examiner

USER INTERFACE FOR A FINANCIAL MODELING SYSTEM

RELATED APPLICATIONS

The present application is a continuation-in-part of U.S. application Ser. No. 09/431,684 entitled "SYSTEM, METHOD AND ARTICLE OF MANUFACTURE FOR A GRAPHICAL USER INTERFACE CAPABLE OF DYNAMICALLY AND INTERACTIVELY CAPTURING A FINANCIAL INTENTION OF A USER" filed Nov. 1, 1999, and U.S. application Ser. No. 09/579,852 entitled "SYSTEM, METHOD AND ARTICLE OF MANUFACTURE FOR A RISK/REWARD MAP IN A FINANCIAL MANAGEMENT/ADVICE GUI" filed May 25, 2000 itself a continuation-in-part of U.S. application Ser. No. 09/452,273 titled "SYSTEM, METHOD AND ARTICLE OF MANUFACTURE FOR INVESTMENT PORTFOLIO MANAGEMENT IN A NETWORK-BASED FINANCIAL FRAMEWORK" filed Nov. 30, 1999 all of which we incorporated herein by reference.

FIELD OF INVENTION

The present invention relates generally to computerized information systems and more particularly to web-enabled computer implemented financial modeling systems.

BACKGROUND OF THE INVENTION

Traditionally, many individuals have entrusted their financial plans to personal financial advisors. But today, more and more individuals are taking their financial destiny into their own hands and playing a more active role in planning and achieving their financial goals.

Increasingly, these individuals rely on computer-based systems that organize their financial assets and liabilities and further provide them with a summary of their financial health. However, financial modeling systems require a great deal of data input and users become discouraged by the tediousness of the task. Furthermore, these systems tend to focus on the administrative aspects of financial planning without enabling the user to make reasoned choices about their financial futures. Also, these systems are limited by their inability to dynamically analyze the user's financial goals. These limitations are counterproductive to the user's needs to develop and manage an integrated personal financial plan from an executive decision-making perspective.

Most existing financial management systems do little more than to allow users to electronically organize their financial assets and liabilities. These systems typically focus on presenting the user with a transactional summary of their financial health. However, these systems fail to capture the user's financial intentions and expectations about their future. Furthermore, these systems typically rely on the users to continually update their personal financial data. As a result, these systems are merely data-driven calculators that are incapable of providing the user with meaningful financial advice tailored to their financial intentions and expectations.

Similarly, some financial management systems present a static view of the user's financial health. These systems typically require the user to provide the most current financial data relating to their financial assets and liabilities. Consequently, when the user wishes to develop or update their financial plan, the user must input their most recent financial information. This problem is further exacerbated by the fact that these systems demand a lot of typing and guessing when the user enters their financial data. This process is time-consuming and inefficient and does not promote an intuitive understanding of how complex financial variables interact to produce a sensible financial plan.

Furthermore, most systems lack full interactivity. The user can only interact with the system. If there is need to communicate with a live advisor, he has to do so outside the confines of the system. Automated coaching beyond simple "how to use" menus are another important ingredient in making a financial system useful and flexible.

No system currently exists that combines the ease of use of an interactive and a dynamic graphical user interface with the abilities of a high power financial modeling system. In today's investment market, more and more users are acting as their own financial advisor. Therefore there is also a need for a financial system that combines a high power financial modeling tool with ease of use, context sensitive coaching, and interactivity with a live advisor, allowing the to assume an executive decision making role in managing their financial life.

SUMMARY OF INVENTION

The present invention relates to a graphical user interface operating within a financial modeling and management system. The system operates in a collaborative computing environment between the user and a financial advisor and comprises a model generating sub-system and financial coaching generating sub-system. In one embodiment of the present invention, a service level subsystem allows the user to negotiate a service level agreement that defines the user's optimal level of support and limits access to user provided information. The coaching generating subsystem is coupled to the service level subsystem and includes one or more coaching engines that dynamically analyze the financial needs of the user in accordance with the user's service level agreement. Furthermore, the coaching engine provides customized financial advice tailored to the user's life intentions.

In one embodiment of the present invention the system provides an intuitive graphical user interface (GUI) allowing the user to input his life intentions in terms of user revenue intentions and user expense intentions with the selection of intention icons. Both, during the setup of the model and during the use of the model, the user may contact a live advisor by selecting from a variety of communication icons. The present invention also provides interactive and dynamic windows for an automated coaching engine. The coaching window displays context sensitive coaching strings related to the user financial model and information.

In another embodiment of the present invention, the system provides a GUI within the context of a financial portfolio modeling framework. The GUI interface allows the user to input and analyze his financial portfolio, and compare its performance to user selected bench marks by selecting from various function icons and manipulate his portfolio using simple and intuitive function icons. The graphical user interface displays the results of the user's manipulations of the model in intuitive and simple to understand representation. The GUI further displays other model related characteristics to the user, allowing him to see the effect of his manipulations on various investment metrics.

By providing the easy to use and intuitive Graphical User Interface of the present invention, the user quickly learns to interacts with the system and develop a trust essential to taking full advantage of the financial modeling system. Therefore, the user is able to take full advantage of all the benefits the system has to offer sooner. These and other advantages of the present invention will be apparent upon a study of the following descriptions and drawings.

BRIEF DESCRIPTION OF THE DRAWINGS

The foregoing and other objects, aspects and advantages are better understood from the following detailed description of a preferred embodiment of the invention with reference to the drawings, in which.

DETAILED DESCRIPTION OF THE PREFERRED EMBODIMENTS

Figure 1:
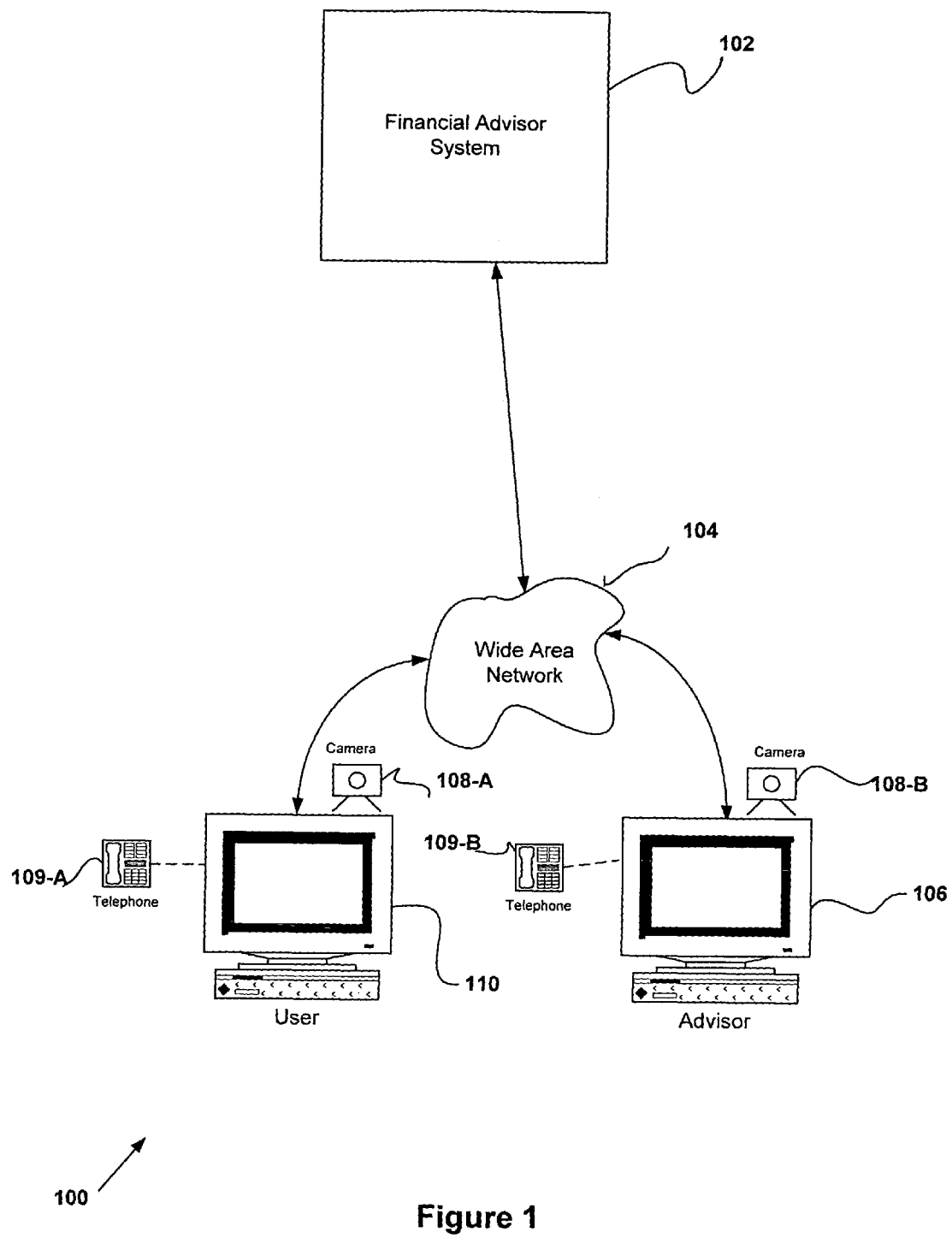
FIG. 1 illustrates a representative system architecture in accordance with a preferred embodiment.

FIG. 1 is an illustration of one embodiment of a financial management information system, in accordance with the present invention, for providing personalized financial advice in a collaborative computing environment. In FIG. 1, financial management system 100 includes a financial coaching system 102 connected through a wide area network 104 to the live advisor terminal 106 a user terminal 110. The wide area network 104 is the Internet. The Internet is based on the TCP/IP communication protocol first developed by the Department Of Defense in the 1960s. The present invention may be implemented using any other protocols and many other networking system, including wireless networks, the Network File Service (NFS) protocol used by Sun Microsystems or a Novel network based on the UDP/IPX protocol.

Preferably, the financial coaching system 102 communicates with the user through any number of devices such as handheld wireless personal organizers, pagers, cellular telephones, land telephones and regular desktop computers. All of the above equipment can act as a user terminal 110.

The user (e.g. individuals or company representative seeking financial advice) may access the system using a user terminal 110 (e.g. personal computer). A typical user computer terminal would be described in more detail in FIG. 3. The user computer is preferably equipped with software to receive live streaming video and/or still pictures over the wide area network 104, from the advisor video camera 108-B. Preferably, the user terminal 110 is further equipped with a video camera 108-A and software to transmit live streaming video from the user, across the network 104 to the live advisor at the advisor terminal 106. Access to the live financial advisor 106 and all other services provided by the Financial management system is controlled and channeled through the Financial Advisor system 102. The user can access the financial coaching system 102 through the Internet 104 or by telephone 109-A. A user telephone call is channeled through a call center discussed further subsequently in FIG. 2 to the Financial Coaching System and to the live advisor 106.

The live advisor terminal 106 is preferably equipped with the video camera 108-B for transmitting live streaming video. The live advisor 106 may further communicate with the user via a telephone 109-B.

Figure 2:
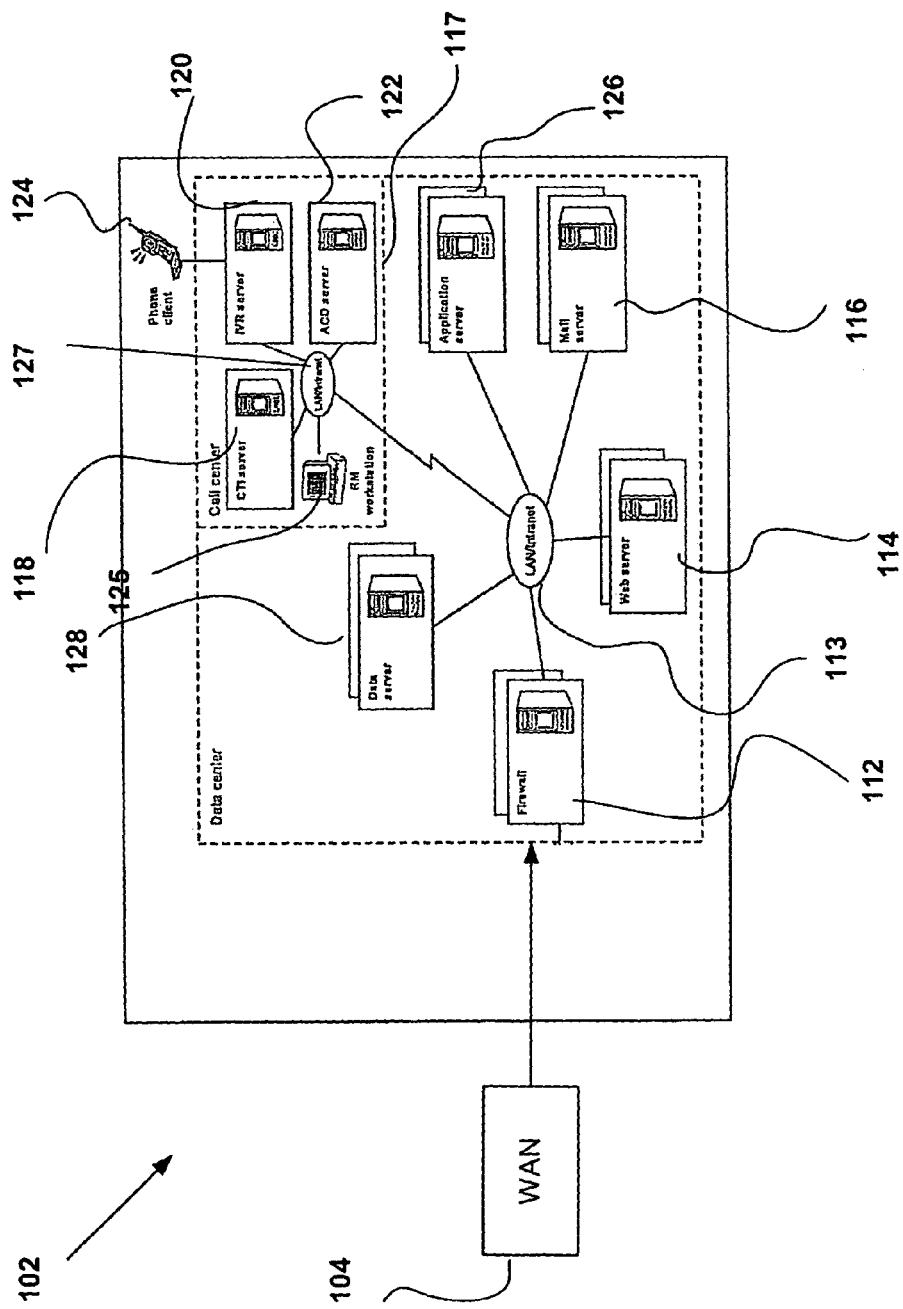
FIG. 2 is a block diagram of a financial management system.

FIG. 2 is a block diagram of an implementation of the financial advisor system 102. The user may access the system through the wide area network 104 connected to the Internet, and going through a firewall server 112. In a preferable implementation of the present invention, the wide area network is the Internet, an intranet, etc. A Web server 114 provides the user with a personalized website providing an interactive interface between the user, the financial advisor and financial management system 100. The financial coaching system 102 further comprises of a mail server 116, an application server 126, a call center 117 and a data server 128, all interconnected through a local area network 113. The local area network (LAN) 113 may be any wide area intranet system or the internet.

Security is important in any financial system. The firewall server 112 controls the access to the financial advisor system. The purpose and functionality of a firewall server is to prevent access to the system by unauthorized users and it would be appreciated by one skilled in the arts. Firewall servers are available through a variety of vendors and have become a standard feature of any secure system used as the primary defense against intruders and hackers.

The web server 114 provides a personalized interactive web page environment for the user to operate in once he accesses the system. The web page is acting as the web interface between the financial system Web pages are created using the Hyper Text Markup Language (HTML) scripting languages such as Java Script™ or Pearl™ as well as Java™ applets. Creation of customized web page using any of the above programming languages is well within the scope of one skilled in the arts. The personalized web page provides an environment and an interface for the user to interact with the financial advisor system 102. As an example, in one embodiment of the present invention, by selecting an appropriate icon from the interactive personalized website, the user is able to learn, plan, decide, transact and monitor his financial model.

The mail server 116 handles electronic mail communication between the user and the financial coaching system 102. The Mail server 116 may operate using any standard protocol such as Simple Mail Transfer Protocol (SMTP) and it is within the scope of the knowledge of one skilled in the art.

The application server 126 is where the various modules of the financial coaching system reside. The modules include the various coaching engines, the LifePath and the portfolio modeling sub-systems. The applications may be implemented in many programming languages, including the object oriented programming languages such as C++ or Java™ and be based on any platform such as UNIX™, Apple OS™ or Windows™ and NTT™. Furthermore, the coaching engine rules for various coaching engine can reside on a data server 180.

Alternatively, the user may also interact with financial coaching system 102 through a telephone 124. The user's call is channeled through the call center system 117. The call center 117 includes an Automatic Call Distribution (ACD) server 122, an Interactive Voice Response Server (IVR) 124, a Computer Telephony Integration (CTI) server 118 and a RM workstation 125, all interconnected through a Local Area Network or intranet 127. The local area network 113 may also be used in interconnecting the various servers of call center. When the user calls into the financial coaching system 102 using a remote telephone 124, the IVR sever 124 receives the user's telephone call. The IVR system greets callers, prompting them for identification, and providing some information automatically. The Automatic Call Distributor (ACD) server 122 distributes the call using the Internet Protocol (IP) over the network, to the appropriate live coach. The Computer Telephony integration server (CTI) 118 acts as the link between the live advisor's telephone call and the workstation based applications and allows them to automatically work together. As an example, when the IVR server 120 obtains some information about the calling user, this information is delivered to the live advisor's workstation 106, so the advisor does not have to request the same information again. Once the telephone call is properly routed to the live advisor, the user can user other means of communication such as electronic mail or White Board™ simultaneously while he is interacting with the live advisor.

The Data server 128 stores user input data and supplies the application Server 126. The data server 128 includes outside database sources from which the financial coaching system 102 can draw information such as actuarial data as well as historical price data on securities from sources such as Reuters, user financial information such as banking and portfolio information in other financial institutions, and market information such as the days closing numbers for various market indices as well as individual stock securities pricing information. Formatted in the Open File Exchange (OFX) format, now the accepted interne standard used by programs such as Quicken™ and MS Money™ the data server through the firewall can easily exchange information with the outside world and specifically the user.

It should be noted that various computing platforms could be used to access the financial management system of the present invention. For example, a networked personal computer environment, a client-server system, a mainframe terminal environment, WEB TV terminal environment, dumb terminal environments can be used to access the financial management system of present invention. Depending upon the user's needs, a client-server system may be the most preferable computing system for implementing the financial system of the present invention. Furthermore, the representation of each server such as an application server or a data server, is a logical representation. The actual physical systems may be distributed over many servers, or be included on a single machine.

Figure 3:
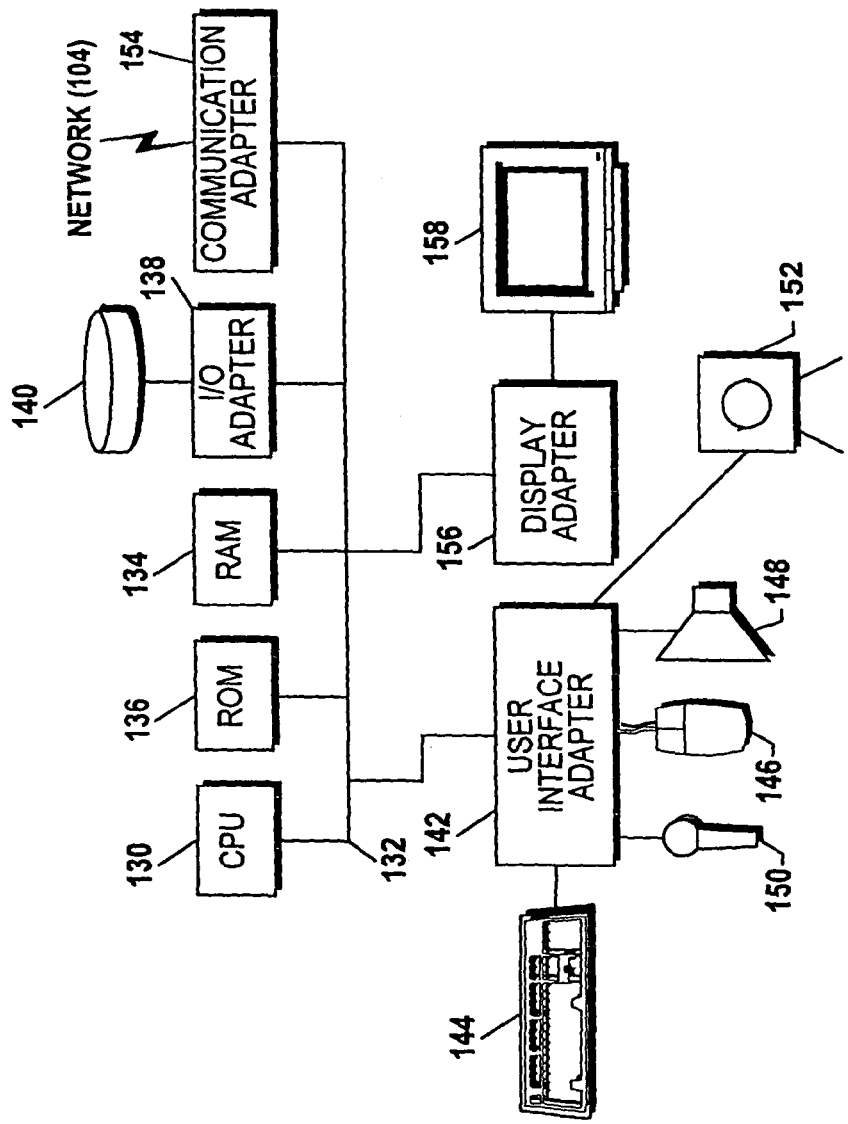
FIG. 3 is a block diagram of a representative hardware environment in accordance with a preferred embodiment.

FIG. 3 is a computer system architecture that can be used in implementing the present invention. This computer system architecture can be used to implement a user workstation, or any of the servers called for in FIG. 2. The present invention may be practiced on any of the personal computer platforms available in the market such as an IBM™ compatible personal computer, an Apple Macintosh™ computer, Solaris™ or UNIX™ based workstation. The operating system environment necessary to practice the present invention can be based on Windows™, NT™, UNIX™, Apple Operating System™, or open source operating system software such as Linux™ and Apache™. Furthermore, the computer system can support a number of processes. As appreciated by one skilled in the art, the processes may be written in any of the available programming languages including object oriented programming languages such as Java™ or C++.

The computer system architecture depicted in FIG. 3 includes of a central processing unit 130, such as a microprocessor, a read only memory (ROM) 136, a random access memory (RAM) 134, an input and output adapter 138, a storage device 140, and interface 142 connecting a plurality of input and output device such as a keyboard 144, a mouse 146, a speaker 148, a microphone 150, a video camera 152 and a display 158, and a system bus interconnecting all the components together. The computer may also include such devices as a touch screen (not shown) connected to the bus 132 and communication adapter 154 such as a dial up modem, a Digital Subscriber Line (DSL) modem or a cable modem, for connecting the workstation to the Internet 104. The storage device 140 can be any number of devices including but not limited to hard disk drive, a floppy drive, CD-ROM, DVD, a tape device, and removable magnetic storage devices such as a Jazz™ drive or ZIP™ drive. There are therefore a number of computer readable media encompassed by system depicted in FIG. 3, including but not limited to RAM 134, ROM 136, storage device 140, and storage accessible over the Internet 104.

Figure 4:
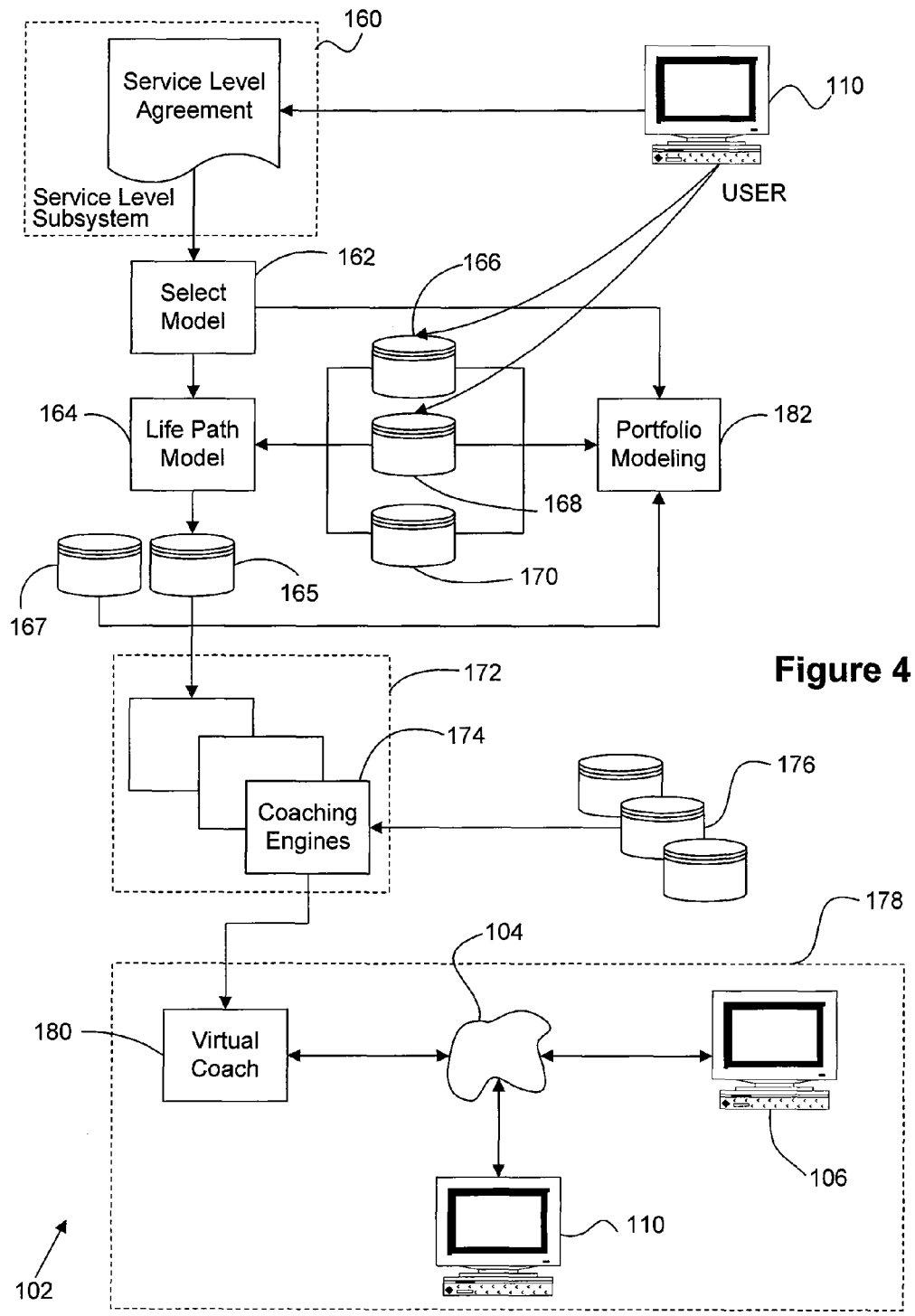
FIG. 4 is a block diagram of a financial management system.

FIG. 4 represents an illustration of the data flow of a financial coaching System 102 of the present invention. A user using for example the user computer 110, preferably connects to the Financial coaching system 102 over the Internet 104. After authentication by a firewall server, the user at a user terminal 110 enters the Financial coaching system 102 at the service level subsystem 160. The service level agreement provides the level of services to which the user is entitled. Once the user has negotiated a service level agreement 161, he is prompted to select the model to be used in operation 162. In one embodiment of the present invention, the level of service and support selected in the service level agreement 160 controls the user's access to different modeling tools.

In a preferred embodiment of the present invention the LifePath model may be the hub of the financial institution's relationship. The LifePath model provides data to all coaching engines allowing customized coaching output to be dispensed to the user based on his unique financial situation. The LifePath model combines all the pertinent financial information about a user in one coherent and comprehensive picture and models the user's life intentions into an aggregated cash flow system over a user selected period of time. Using the terminal 110 the user inputs his life intentions in terms of projected income and expenses. The LifePath model 164 maintains an interactive dialog between the user and financial management system 100. The LifePath model integrates the financial information available about the user in accordance with the user's service level agreement 160 to create an aggregate forecast of cash flow over the user's lifetime. The financial information available about the user includes the user's life intentions data 166 and the user's external financial data 168. In a preferred embodiment of the present invention, the user's external financial data can include current checking account information from the user's bank or data related the user's retirement investment plan. By incorporating external data 168 into the LifePath model 164, the system is capable of dynamically analyzing the financial needs of the user and providing the user with an understanding of their financial health at any point with minimal input form the user. As discussed above, personalized service level agreement 160 can optionally allow the user to limit the system's and/or advisor's access to the user's external financial data 168.

Additionally, LifePath model 164 also integrates external market data 170 into the aggregated forecast of the user's cash flow. In one embodiment of the present invention, external market data 170 includes information such as current mortgage interest rates or market inflation rates. Access to both internal and external databases is controlled by the user's service level agreement. The LifePath modeling tool 164 is further discussed in a related U.S. application named the LifePath Counseling by the same inventors as the present invention, application Ser. No. 09/705,288, filed on the same day as the present application and incorporated herein by reference.

Alternatively, the user may by pass the LifePath model and start with a portfolio modeling tool 182. The availability of the portfolio modeling tool is based on the user's service level agreement 161. The user would supply his financial portfolio information to the financial advising system 102, either directly using the user terminal 110 or indirectly through the wide area network 104, by accessing a multiplicity of databases 166, 168 and 170, and accessing information such as his securities portfolio at a particular brokerage firm.

A financial portfolio modeling tool 182, is an interactive tool that has access to the all the information available to the LifePath model 162, such as the user's life intentions data 166, the user's external financial data 168, as well as external market data 170. User insight data 167 and aggregated data from the LifePath model 165 is also available to the portfolio modeling tool. As a result the user has little to input and may start using the portfolio model 182 very quickly without the need to do a lot of tedious data input. The financial portfolio modeling also allows the user to access a computer coach and/or a live advisor based in part on the service level agreement.

An alternative embodiment allows the user to use the LifePath model 164 and set his long term financial goals and then use the portfolio modeling tool 182 to adjust his investment portfolio to better achieve his long term financial goals.

The LifePath interactive financial model may capture customer's intentions at the start of the relationship and displays them as lifetime cash flow requirements. Customer data and LifePath information combine to form a deep understanding of the customer's financial needs at each stage of life. Using dynamic, interactive multimedia, it quickly captures the customer's intentions and expectations about an ideal future. This flushes out some issues which trigger the initial discussions in the relationship. It also supports estimating the lifetime value of the customer and the appropriate levels of service. The data from this model combines with insight from product and transaction history as well as real time input from the abundance of interactive models to power rule-based coaching engines. This automated coaching leverages the advisor's time so that a broad customer based can be profitably supported. Configured using sliders and other interactive controls, there is little typing to slow the process down. The controls build a linear graphic representation of a life path which models predictable life transitions over time more effectively then data-driven calculators. Sales opportunities, lifetime customer value and appropriate fee structure are now more accurately identified.

Coaching generating subsystem 172 comprises one or more advice or coaching engines 174. Coaching engine 174 dynamically analyzes the financial needs of the user in accordance with the user's service level agreement. Furthermore, the coaching engine 174 is configured to operate with coaching engine rules repository 176. Coaching engine rules repository 176 is a collection of rules-based business logic that produces clear automated advice. Coaching engine rules repository 176 generates its advice using LifePath data 165 and user insight data 167. Alternatively the investment portfolio data from the portfolio modeling tool 182 triggers the coaching engines advise. In one embodiment of the invention, user insight data 167 includes transaction history, product or purchase history, as well as demographic information about the user.

In addition to providing coaching to the user, advice generating subsystem 172 also recommends product solutions to the user. As an example, in one embodiment of the present invention, the coaching engine 174 can recommend that the user include deposit products and loan products in their financial plan. For example, the coaching engine 174 can recommend that the user acquire a certain mortgage or bridge financing. Similarly, the coaching engine 174 can also direct the user to the need for financial products such as, home improvement, line of credit, or credit card products. Coaching engine 174 can also have access to product information from various financial institutions (not shown). Accordingly, the user can request additional information about the various products recommended by the system.

The user can access their financial plan or life path model using user terminal 110. User terminal 110 is part of collaborative computing environment 178 and is in data communication with virtual coach 180 and the advisor terminal 106 through the Internet 104.

The coaching and product solutions generated by the coaching generating subsystem 172 are presented to the user through virtual coach 180. Virtual coach 180 presents the product recommendation with accompanying rationale. The user may or may not wish to contact the dedicated financial advisor for additional coaching, advice or information. Because the system generates reasoned financial coaching in accordance with the user's financial needs and intentions, the financial advisor is able to operate more productively. Furthermore, the user can test different scenarios by altering the data captured by life path model 164. Each scenario can then be analyzed by coaching engine 174. The virtual coach 180 is further described in the related U.S. application named Automated Coaching For A Financial Modeling and Counseling System, application Ser. No. 09/705,255, by the same inventors as the present invention, filed on the same day as the present application and incorporated herein by reference. Furthermore, the LifePath model is further described in the related patent titled A Financial Planning and Counseling System Projecting User Cash Flow, application Ser. No. 09/705,288, by the same inventors as the present invention, filed on the same day as the present invention and herein incorporated by reference.

In addition to virtual coach 180, the user can optionally interact with a dedicated financial advisor 106 through communications network 104. In an embodiment of the present invention, financial advisor 106 is located in a call center 118 on a relationship manager's workstation 125. Financial advisor 106 may interact with user 110 using various multimedia interaction tools, for example, still-shot images or video streaming. Accordingly, the user is able to buttress the coaching received from virtual coach 180 with advice from a dedicated financial advisor operating at terminal 106. In many situations, the live advisor's input may be necessary, since he brings a level of expertise and experience no automated coaching system may match. However, since the automated coaching has framed the problem for the user and the live advisor, both can immediately start analyzing alternative solutions in a focused and cost efficient fashion.

Depending on the level of service the user has negotiated with the service level agreement 161, he may have a multiplicity of modeling tools available in the financial management system. In alternative embodiments of the present invention, modeling tools for analyzing various financial instruments such as bonds, reverse mortgages, option contracts and the like may be available to the user.

Figure 5:
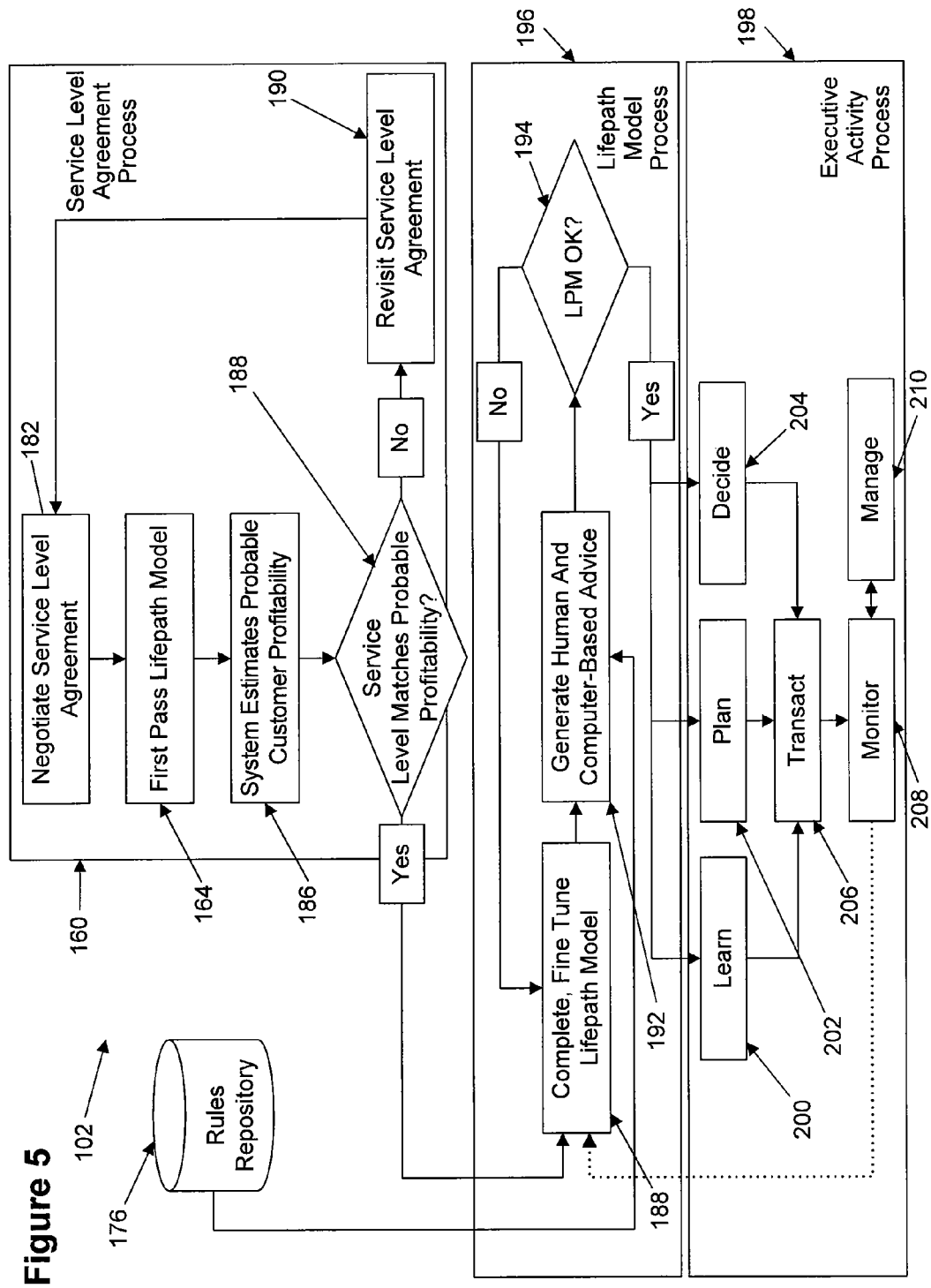
FIG. 5 is a flow diagram a financial management system.

FIG. 5 illustrates a flow diagram of an embodiment of the Financial coaching system 102. The service level agreement process 160 may be one possible entry point for the user into the Financial coaching system 102, where the user negotiates a service level agreement and sets the level of financial service desired. The service level agreement 161 defines the user's desired level of advisor support as well as limiting the system's access to user provided information.

After the service level agreement 182 has been negotiated, the user makes a first pass through the LifePath model 164. Note operation 184. In one embodiment of the present invention, the user may input its life intentions in terms of revenue intentions and expense intentions. The system then aggregates the information into a cash flow analysis over a user's income and expenses over a user defined period of time. The model may also include external data related to the user's finances. After a first pass through the LifePath model (process 184), the system may estimate the probable customer profitability 186 based on the user's financial plan given the user's life intentions and other financial information. If the user's service level agreement does not match the probable profitability 188, the user can renegotiate the service level agreement negotiation or revisit LifePath model 184 to modify the model parameters, and then prompt the system to re-estimate the probable user profitability 184.

After fine tuning the LifePath model 188, context sensitive automated computer coaching 192 is provided to the user using a coaching engine based on business logic in a rule-based engine. The rules repository 176 supplies business rules. The automated coaching engine 174 may highlight for the user periods within his LifePath model which need special attention, such as a projected cash deficit or cash surplus. Based on the coaching from the automated coaching engine 174 and/or a live advisor, the user may accept or reject the LifePath model 194. If the user rejects the LifePath model, he may further modify and fine tune the LifePath model 188 until he is satisfied.

In one embodiment of the present invention, the life path model process 196 is followed by an Executive activity process 198 where the system allows the user to assume an executive decision-making role in making their financial future. The executive activity process 198 enhances the user's ability to manage his or her financial life from an executive perspective. For example, through interaction with the system, the user learns 200, plans 202, or decides 204 the respective elements of their financial plan. Since the LifePath model 164 projects the user's cash flow in the future, the user may use the LifePath modeling tool 164 to change input variables such as savings, salary and expenses, and observe the long term effect of the changes on his financial goals. The intuitive graphical display of the LifePath model allows the user to get an immediate qualitative as well as quantitative feedback of the effects of the incremental changes on his long term goals. After engaging in these activities, the user may choose to seek accredited advice about purchase/sale of financial products based on coaching provided by the system. In an alternative embodiment of the present invention, the live advisor may recommend various financial products suitable to the user's financial situation after the user has used automated coaching to focus his investment goals. Furthermore, after initiating the transaction 206, the user may monitor 208 and/or manage 210 the status of the products selected. In one embodiment of the present invention, the learn icon 200 allows the user to obtain information on the products recommended by the live advisor. The system may have to access outside databases to access third party products which may be beneficial to the user's financial situation. The rule based coaching further may check the governmental regulations and impacts of adding or deleting a specific product to the user's financial portfolio. The governmental regulations analyzed can include an analysis of the tax consequences of using a certain product specific to the user.

Figure 6:
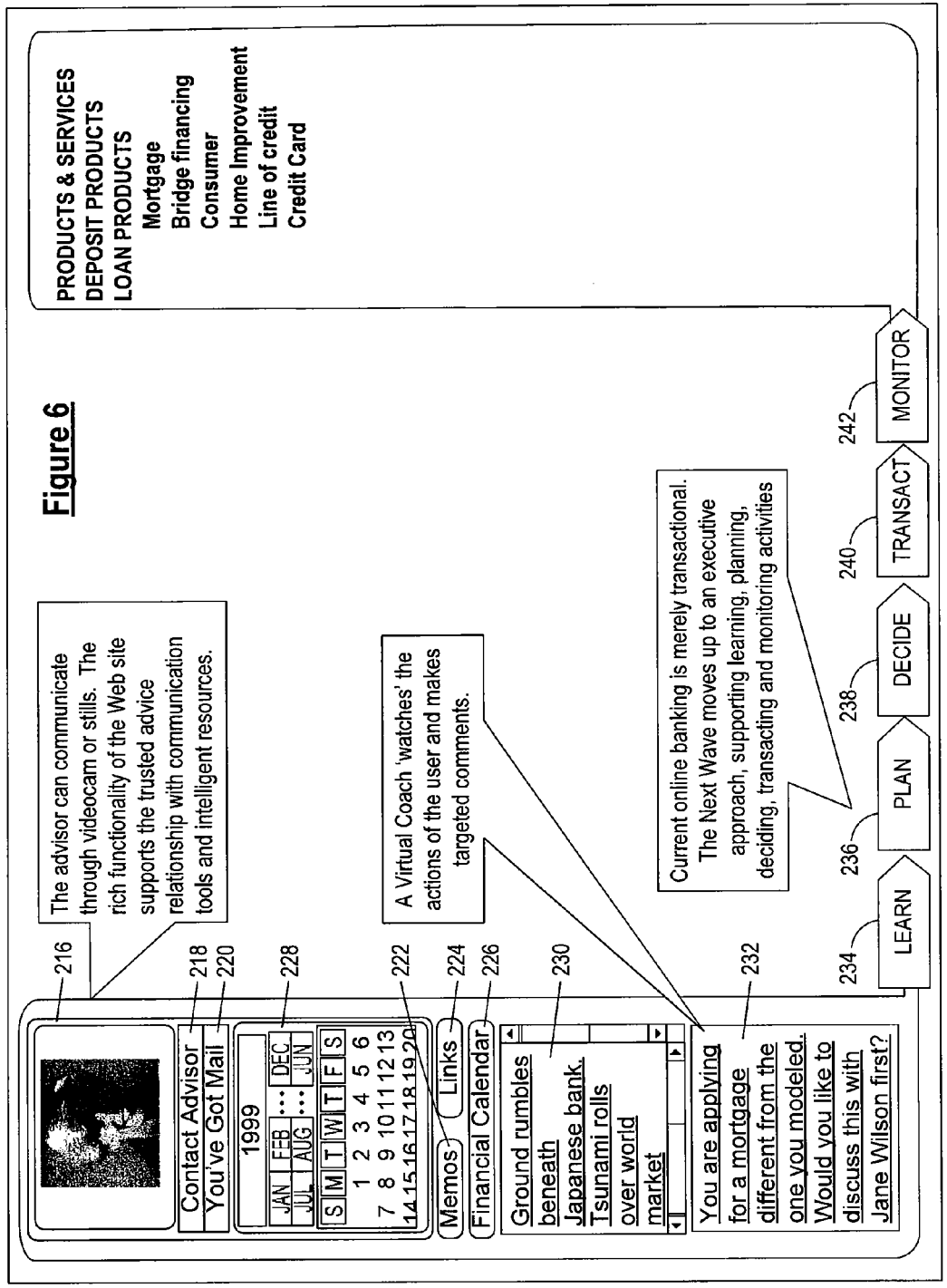
FIG. 6 is an illustration of a LifePath model web page interface.

FIG. 6 is an illustration of a LifePath model web page interface. The web page of FIG. 6 shows a customized web site and an intuitive user interface for the LifePath model subsystem. As previously discussed, the web site would be a personalized web site which a client uses to collaborate with a dedicated virtual (or live) financial advisor.

As depicted, the graphical user interface can include an advisor area 216, where images of the live advisor may be represented as still images, streaming video, or represented by a character. Selecting a link, such as the Contact Advisor link 218 shown, causes a connection to the advisor to be established. Preferably, the advisor and the user are able to communicate orally via network telephony of a type known in the art, but communication via email, chat, telephone call, or of any other type is acceptable as discussed in FIG. 2. The communication interface between the user and the financial advisor system is further discussed in the related U.S. application named Communication Interface for a Financial Advising System by the same inventors as the present application, application Ser. No. 09/705,290, filed on the same day as the present invention and incorporated herein by reference.

The advisor uses the space to negotiate an initial Service Level Agreement (SLA), and begin the modeling of the customer's LifePath. This flushes out issues and permits an early estimate of customer value potential. The SLA nails down how much advisor time the customer wants, how information will be shared, and how much intentions-based advice the customer will welcome. The advisor configures the Web site in accordance with this agreement. The investment of effort in this, along with the personal online relationship begins to develop "stickiness" also defined as customer loyalty. Much of the communication presented by the system is generated by rule-based business logic. This is what leverages the advisors, extending their reach. It should be noted that the client negotiates a Service Level Agreement at the start of the relationship for desired level of advisor support and how the bank may or may not use their personal information. Website functionality can provide new levels of customer support even if customer wants low level of advisor interaction.

A link 220 may be provided that allows access to email. Other links can include a link 222 to personal memoranda, a link 224 to a links page, and a link 226 to a financial calendar. As an option, a calendar 228 and links 230 to news stories may be displayed on the page. In one embodiment of the present invention, the news can be customized by each user to fit his individual needs.

A virtual coach area 232 of the page can be provided to display the comments and advice created by the virtual coach. As described above, client data drives a rules-based "coaching engine" that dynamically analyzes customer needs and automates most of advisor's work. The client is encouraged to consolidate all their financial information in the site, recognizing assets and liabilities with other financial institutions. The virtual coaching area can be used both as customized coaching and as a platform to introduce various financial products, including third party products brokered by the financial institution owning the financial advisor system.

Upon selection of a button depicted along the bottom of the screen, a particular feature of the financial management system is displayed. For example, selecting the learn button 234 may bring up a portion of the screen (or a new screen) that discusses the functions and features of the financial management system. In an alternative embodiment, the learn button may be used to obtain specific information on the financial products presented to the user. The plan button 236 may display the LifePath model in time series form. A decide button 238 may display a screen that allows the user to make financial decisions, such as allowing a user to select transactions recommended by the advisor and/or the virtual coach. A transact button 240 may display a transaction screen on which the user performs transactions. A monitor button 242 may display current and/or historical information about transactions made by the user and/or financial performance.

The LifePath interactive financial model captures customer's intentions at the start of the relationship and displays them as lifetime cash flow requirements. Customer data and LifePath information combine to form a deep understanding of the customer's financial needs at each stage of life. Using dynamic, interactive multimedia, it quickly captures the customer's intentions and expectations about an ideal future. This flushes out some issues which trigger the initial discussions in the relationship. It also supports estimating the lifetime value of the customer and the appropriate levels of service. The data from this model combines with insight from product and transaction history as well as real time input from the abundance of interactive models to power rule-based coaching engines. This automated coaching leverages the advisor's time so that a broad customer based can be profitably supported. Configured using sliders and other interactive controls, there is little typing to slow the process down. The controls build a linear graphic representation of a life path which models predictable life transitions over time more effectively then data-driven calculators. Sales opportunities, lifetime customer value and appropriate fee structure are now more accurately identified.

Risk analysis may be integrated into the LifePath model enabling clients to better understand their financial health and to improve trade-off decisions. Formulating a personal risk/reward strategy is difficult. The LifePath model supports a risk simulator, showing how the ideal model would be impacted by typical life crises. The model can be played repeatedly with varying outcomes to foster an intuitive understanding of exposure and to provide grounded input into trade-off decisions. Using the risk modeling tools, the advisor can add value, consolidate the relationship and rationalize a stream of product sales.

Figure 7:
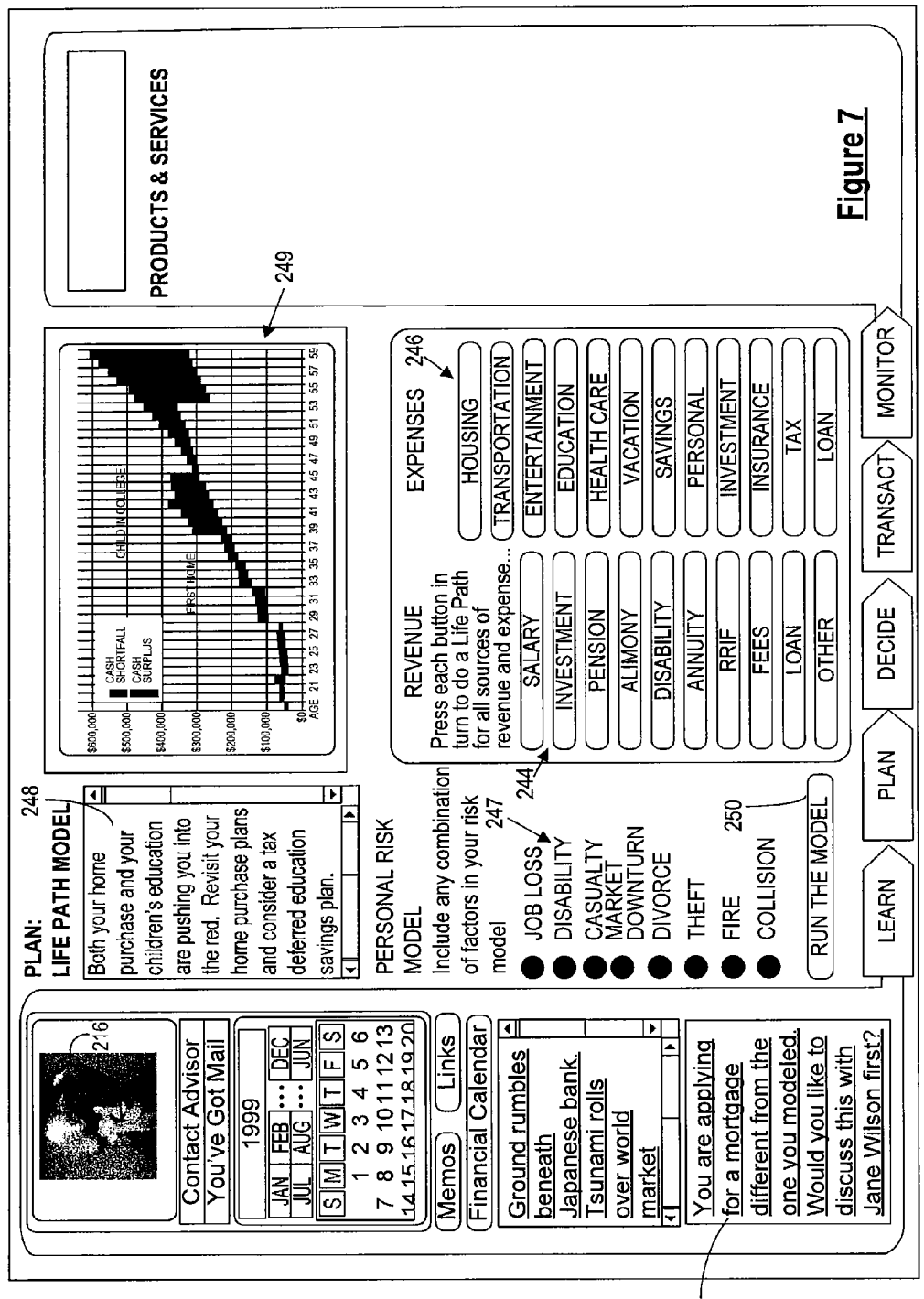
FIG. 7 is another illustration of a LifePath model web page interface.

As shown in FIG. 7, LifePath model 164 captures the user's life intentions expressed as revenue intentions 244 and expense intentions 246. As discussed above, revenue intentions 244 are a summary of the user's expense information 246. The user may be provided with an individual button for each of the income information categories 244. For example, the user may input their income information such as salary, investment, pension, alimony, or disability, or other financial information as shown in FIG. 7. Similarly, the user can input their expense intentions which are shown by the category of interactive buttons 246. For example, the user can input expense information such as housing, transportation, education, health care, or other expense information as shown in FIG. 7. Neither the income category nor the expense category is limited to the displayed icons. The "other" button under the revenue category enables the user to input user specific sources of revenue such as inheritance. Same flexibility applies to the expense category allowing the user to input types of expenses not categorized under the standard expense icons. The user may import his past revenue and expenses from financial programs such as Quicken™ or MS Money™ simplifying reducing the amount of typing necessary to do so.

Additionally, the user can control the level of risk that the model considers by selecting one or more of the graphical user interface ("GUI") elements from the list of risk events 247. The risk events 247 include various life events that may affect the user's life path model. For example, the user can request that the model include job loss, disability, casualty, market downturn, or other personal risk factors into their life path model. In one embodiment of the present invention, the risk modeling component uses actuarial data from outside databases to supply the data related to the probability and the effect of the occurrence of a particular risk event. Alternatively, the user may estimate the impact of a particular risk event. For example a user may estimate the possibility of a job loss knowing his skill sets and the status of the job market. Furthermore, he can better predict the length of time he may be out of work. On the other hand automated coaching, based on actuarial and economic data, may estimate an average length of time a typical person in the user's field of expertise may remain out of work after a job loss. The user may accept or reject the automated coach's estimates and use his own information.

After providing the model with his or her life intentions expressed as revenue intentions 244 or expense intentions 246 in addition to any of the risk events, the user can select button 250 to run the life path model and initiate the advice generating subsystem. Accordingly, the user is provided with detailed advice in window 248 that is tailored to the user's life intentions and the risk events specified. As shown in window 248, the user is provided with a clear automated coaching tailored to his or her life intentions gathered by the life path model. Furthermore, the coaching incorporates the risk events specified from the risk factors 247. The graphical display 249 in FIG. 7 is a time series representation of the aggregated total of the user's cash flow over a selected period of time, based on the user provided revenue intentions 244 and expense intentions 246. Additionally, the system provides the user with virtual coaching that watches the actions of the user while progressing through the life path model and provides the user with suggestions to ensure that they continue to comply with his or her life intentions.

In another embodiment of the present invention, the financial advisor system 102 includes a portfolio modeling tool subsystem 182. The user would get to the model either after having setup a financial profile through the LifePath model 164 or he can access the financial portfolio building model directly.

Figure 8:
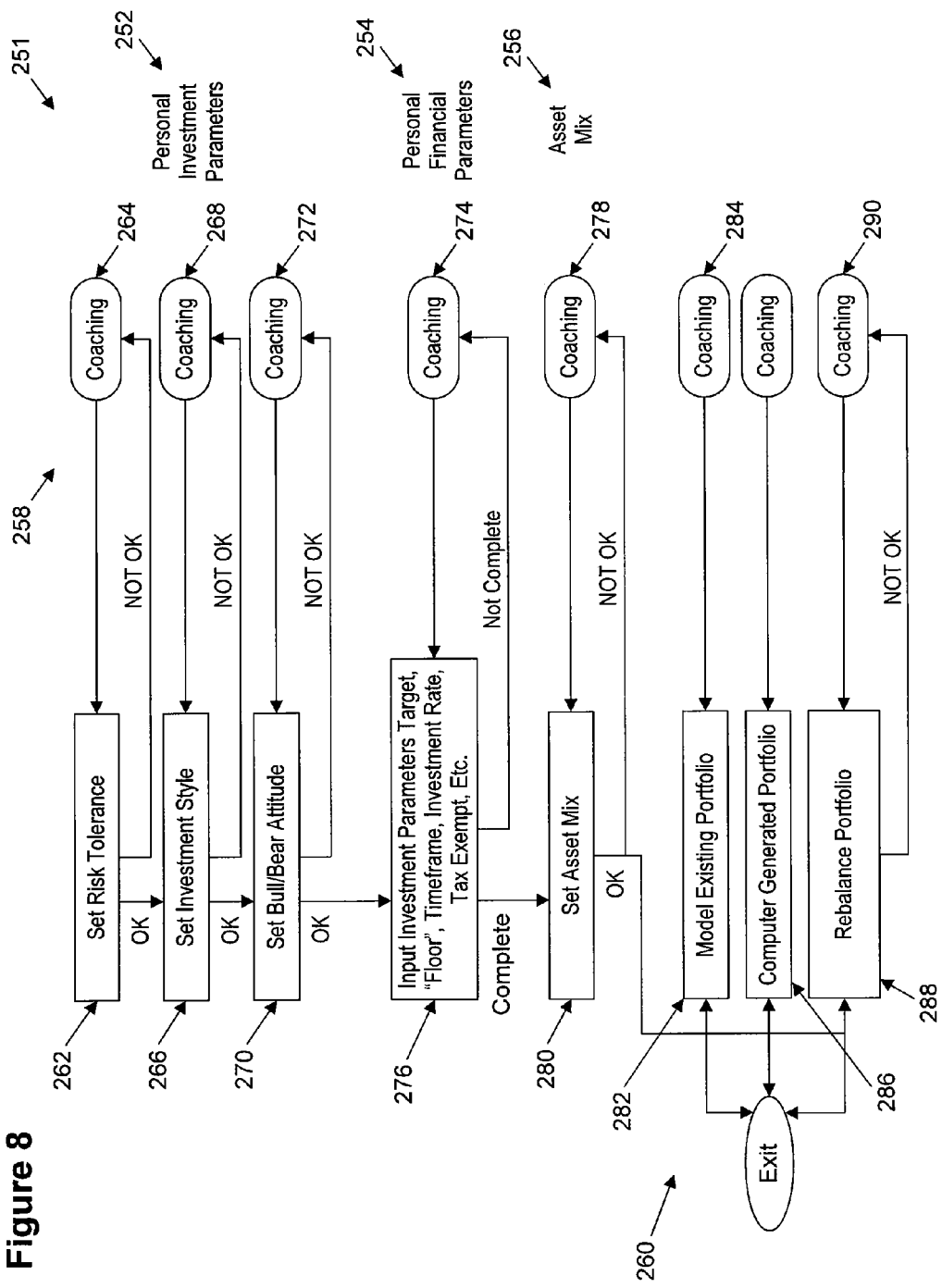
FIG. 8 is a flow diagram of the operation of an Investment Portfolio generator in accordance with a preferred embodiment.

FIG. 8 illustrates an investment portfolio management method utilizing an automated coach in a network based financial framework in accordance with a preferred embodiment of the present invention. First, in operation 251, a plurality of parameters is set for a subject utilizing a network. The parameters include personal investment parameters 252, personal financial parameters 254, and/or asset mix parameters 256. Such parameters may include a minimum retirement, target floor, investment rate, tax implications, etc. In operation, the parameters may be selected manually by the subject using a desired graphic user interface, or by a third party.

Next, the network may be utilized to provide the subject coaching from an investment coaching engine in operations 258, where such coaching relates to the setting of the parameters. The coaching may be provided by utilizing a look-up table which is capable of generating various combinations of coaching based on the settings. In the alternative, the coaching may be generated using any other type of artificial intelligence system.

At least one financial model for a portfolio of the subject is subsequently generated in operation 260 based on the setting of the parameters. This may be generated using a system similar to that which generates the coaching, or any other desired means. The network is again used to provide coaching from the investment coach engine to the subject with the coaching relating to the generated financial model.

As shown in FIG. 8, the personal investment parameters include a risk tolerance parameter 262. Further, the coaching by the coaching engine 264 may provide a textual risk tolerance profile for the subject based upon an interpretation of current risk tolerance parameters of the subject as textual analysis.

Further, the personal investment parameters may include an investment style parameter 266. In such embodiment, the coaching by the coaching engine 268 provides a textual investment style profile for the subject based upon an interpretation of current investing style parameters of the subject as textual analysis.

In yet another embodiment of the present invention, the personal investment parameters include a bull/bear attitude parameter 260. A bull attitude is one of optimism that the stock market will go up, while a bear attitude is one where there is belief that the stock market will go down. In the present embodiment, coaching by the related coaching engine 262 provides a textual description of an implied future of financial markets and graphs showing forecast curves of financial markets based upon the building of financial market forecasts which are, in turn, based upon evaluations from financial experts.

In one embodiment, the coaching by the coaching engine 264 relating to the setting of the personal financial parameters in operation 252 provides an alert if the investment parameters of the subject conflict with LifePath cash flows or personal parameters based on a consistency check of the investment parameters with data obtained from a LifePath model and personal investment parameters.

With continuing reference to FIG. 8, the coaching by the coaching engine 278 relating to the setting of the asset mix parameters in operation 280 provides a rationalization of the asset mix based on personal and financial parameters of the subject and at least one computer generated asset mix. A pie chart may also be included that represents a portfolio showing the subject's assets.

In still another embodiment, the financial model comprises a model of an existing investment portfolio of the subject. Note operation 282. The coaching by the coaching engine 284 provides an analysis of market-related growth by security and sector, trend analysis, fee and service analysis, and/or dividend and interest impact based upon transaction history and current market values of the existing investment portfolio. The coaching by the coaching engine 284 may also provide an analysis of growth, risk and value of the existing investment portfolio based on market data and expert analyst opinion.

Still yet, the coaching by the coaching engine 284 may provide an evaluation of the existing investment portfolio relative to the personal and financial parameters of the subject based on a comparison of growth and volatility projected forecasts to the personal and financial parameters of the subject. It should be noted that similar capabilities may be provided using a model based on a computer generated portfolio in operation 286.

In operation 288, the financial model may include a model of an investment portfolio of the subject generated by the subject with the input of a private banker. Coaching by the coaching engine 290 provides an analysis of growth, risk and value of each security in the investment portfolio based on a concatenated, user-friendly English format of market data and expert analyst opinion obtained utilizing the network 104.

Further, the coaching by the coaching engine 290 may provide an evaluation of the contributions of securities in the investment portfolio relative to the personal and financial parameters of the subject based on a comparison of the personal and financial parameters of the subject to an analysis of risk compliance, growth, and volatility. The information mentioned herein is further described in the related U.S. applications titled Financial Portfolio Risk Management, 09/705,287, A Financial Planning and Counseling System Projecting User Cash Flow, 09/705,288, and Financial Management Modeling and Coaching System, 09/705,154, Automated Coaching for a Financial Modeling and Counseling System, 09/976,443, and Communication Interface for a Financial Modeling and Counseling System, 09/929,735, all by the same inventors as the present application, and all filed on the same day as the present application and herein incorporated by reference.

Most of today's typical investors, typically know relatively little about the technicalities of investing. In one embodiment of the present invention, a financial risk management subsystem may include traditional fundamental/technical data and analyst interpretation. Much of this is meaningless to the average investor however. The present invention's approach meets their information and learning requirements in these ways. First it develops detailed profiles of the user's investment personality and customizes all information such as coaching to the user profile. Second the system uses coaching engines to translate fundamental and technical data into natural language textual coaching string outputs, customized to the user. Furthermore, the financial modeling and counseling system alerts the user to investment activities which are incompliant with his personal investment parameters such as his risk tolerance, investment style and so on . . . . The financial modeling and counseling system further provides automated coaching throughout the investment process.

Risk tolerance, investment style and financial outlook are established through a series of interactive multimedia-based scenarios which unfold online. These exercises provide immediate coaching feedback to the user. The results are stored as a multidimensional profile which is used by modeling and coaching activities throughout the portfolio management process.

Figure 9:
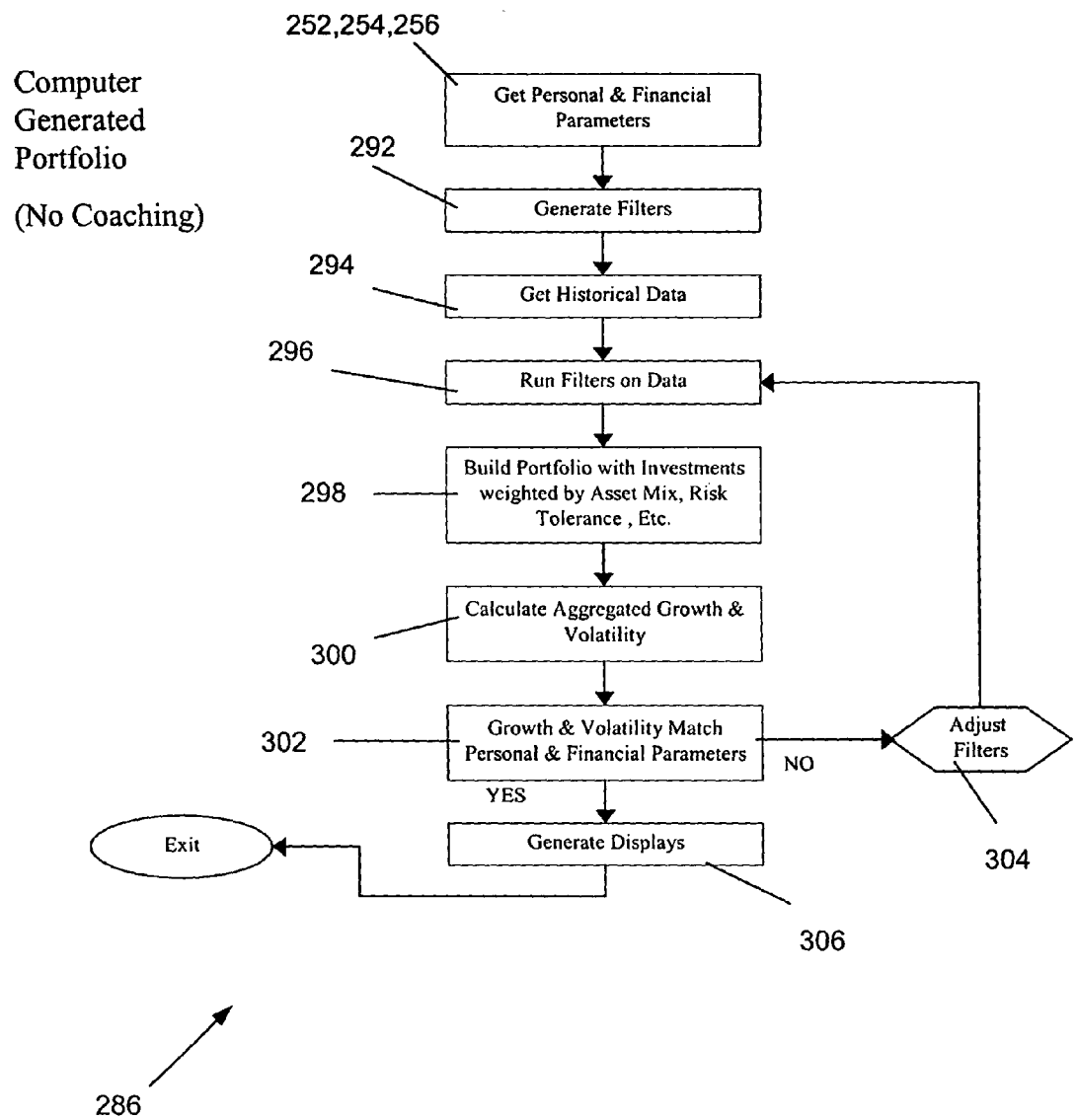
FIG. 9 is a flow diagram of how to build a computer generated portfolio.

FIG. 9 is a flow diagram illustrating a method for automated portfolio generation utilizing a network in accordance with an embodiment of the present invention. First, in operation 252,254 & 256, financial information is received from a subject utilizing a network. In one embodiment of the present invention, the financial information of the subject includes personal investment parameters 252 and/or personal financial parameters 254 of the subject.

Filters are then generated based on the received information of the subject in operation 292. Thereafter, historical data is obtained on investments utilizing the network. Note operation 294. The historical data on investments is then filtered in operation 296 with the generated filters. Using the filtered data, a financial portfolio may then be generated for the subject in operation 298. Further, the filtered data may be weighted by an asset mix and/or risk tolerance of the subject.

In operation 300 shown in FIG. 9, aggregated growth and volatility may be calculated based on the built financial portfolio. Further, it may be determined whether the aggregated growth and volatility match the financial information of the subject. Note operation 302. When it is determined in decision 304 that the aggregated growth and volatility fail to match the financial information of the subject, the filters may be adjusted. Such filters are adjusted until the aggregated growth and volatility match the financial information of the subject. Finally, in operation 306, displays are generated based on the built financial portfolio.

Figure 10:
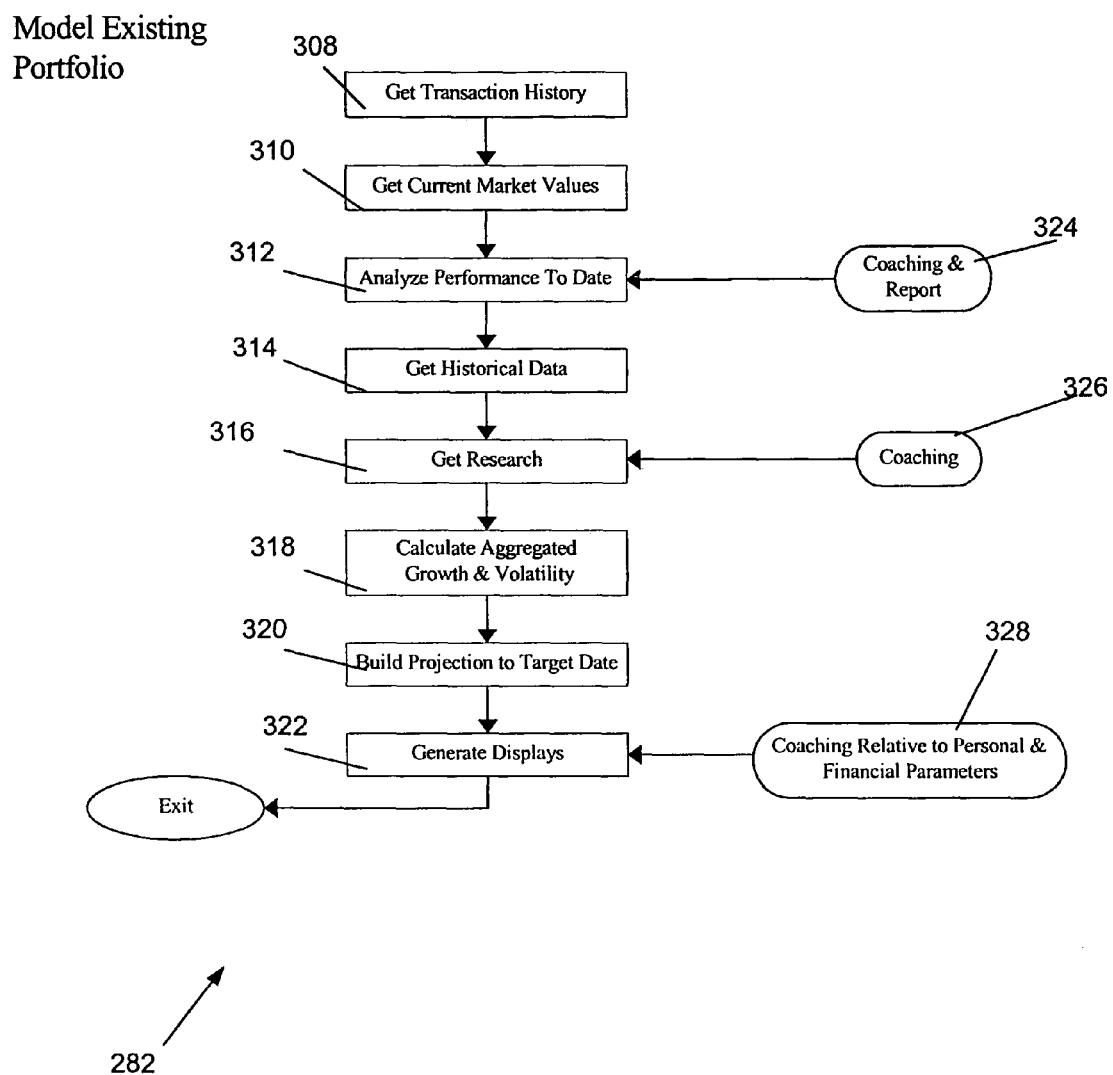
FIG. 10 is a flow diagram of how to model an existing portfolio.

FIG. 10 illustrates a flow diagram for modeling an existing financial portfolio. First, the performance of at least one investment of a subject is determined utilizing a network. As shown, the performance of the investment includes obtaining a transaction history of the investment in operation 308, obtaining a current market value for the investment in operation 310, and analyzing the performance of the investment based on the transaction history and the current market value of the investment. Note operation 312. Next, financial information is obtained relating to the investment of the subject. The step of obtaining the financial information relating to the investment may include obtaining historical data on the investment in operation 314, and obtaining research relating to the historical data of the investment in operation 316.

With continuing reference to FIG. 10, the aggregated growth and volatility of the investment is calculated in operation 318. Such calculation may be performed based on bell curves, and other statistical techniques. Best case and worst case scenarios may also be produced.

A projection to a target date is subsequently built for the investment. Note operation 320. This is done based on the determined performance of the investment, the financial information relating to the investment, and/or the calculated aggregated grown and volatility of the investment. Finally, displays are generated based on the built projection. Note operation 322.

As shown in FIG. 10, coaching and a report 324 may be provided to the subject utilizing the network based on the determined performance of the investment. Further, coaching may be provided to the subject utilizing the network based on the obtained financial information relating to the investment. Note operation 326. Such network may also be used to provide coaching in operation 328 with the generated displays relative to personal and financial parameters of the subject.

Figure 11:
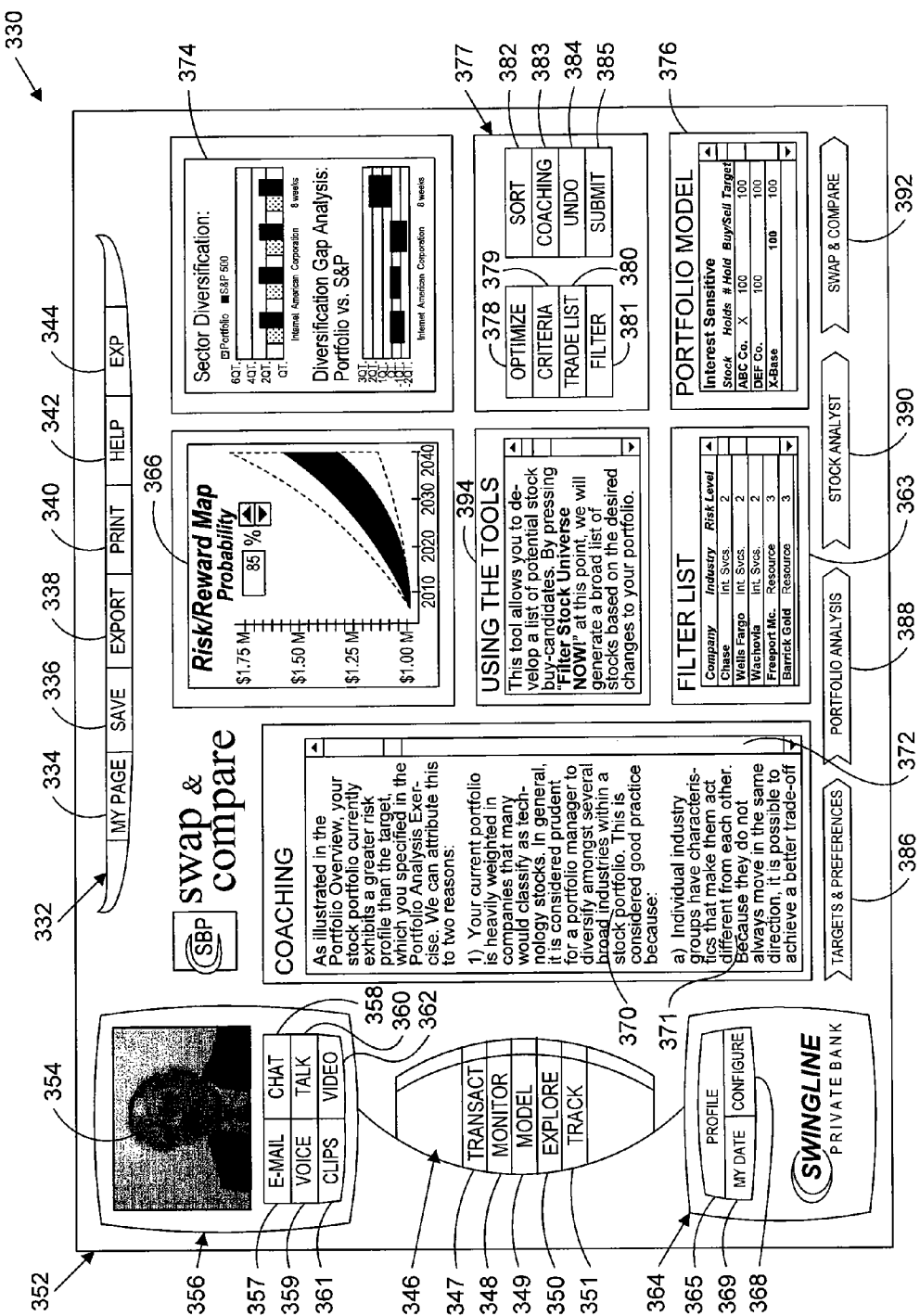
FIG. 11 is an illustration of an investment portfolio generator web page interface.

FIG. 11 is an exemplary graphical user interface 330 that embodies the various concepts and methods set forth for financial portfolio modeling. As shown, the graphical user interface 330 includes a plurality of selection icons 332 including a my page icon 334 for displaying a graphical user interface specifically tailored for a particular user, a save icon 336 for saving any changes made to the graphical user interface 330, an export icon 338 for exporting data displayed by the graphical user interface 330, a print icon 340 for printing various fields of the graphical user interface 330, a help icon 342 for obtaining help information, and an exit icon 344 for exiting the graphical user interface 330.

My page icon 334 displays a web page that can be customized to each user's need, simplifying the use of the portfolio model 182. In one embodiment of the present invention, the portfolio modeling system uses the Open File Exchange (OFX) protocol which has become the standard protocol for the exchange of financial information over a wide area network, and particularly the Internet. Thus exported data from the portfolio modeling system into other financial programs is formatted to be easily usable by these programs.

Further displayed on the graphical user interface 330 is a plurality of mode icons 346 for initiating various modes of operation. The mode icons 346 include a transact icon 347 for initiating transactions involving the purchasing and selling of investments utilizing a network, a monitor icon 348 for monitoring the performance of the investments, a model icon 349 for generating an investment model based on criteria entered by the user, an explore icon 350 for retrieving information on the investments, and a track icon 351 for tracking the investments utilizing the network. In the preferred embodiment of the present invention, the Wide Area Network 104 is the Internet and the portfolio modeling system has access to outside databases such as Reuters and Bloomberg for historical and current securities pricing or market indexes.

With continuing reference to FIG. 11, a communication medium 352 may be employed to converse with other users, namely financial advisers, etc. Such communication medium 352 includes a window 354, and a plurality of communications icons 356 that enable various types of communication between the user and the live coach or advisor. Such communications icons 356 include an e-mail icon 357, a chat icon 358, a voice icon 359, a talk icon 360, a clips icon 361, and a video icon 362. The mail server 116 and call center 118 allow the user to contact the advisor by email or telephone call using the talk icon. The mail server further supports live chat 358 and voice over Internet Protocol is used when voice icon 359 is selected. A collaborative medium such as a collaborative medium such as a White Board™ is used when any of the interactive communication method such as chat or voice over IP is used. Depending on the bandwidth available to the user, he may receive still pictures or live streaming video of the advisor, or he may see an animation.

The incorporation of the various communication technologies and programs within the context of a financial advising system is further described in a related application named Communication Interface for a Financial Modeling and Counseling System, 09/929,735, by the same inventors as the present application, filed on the same day, and incorporated herein by reference.

Using the graphical user interface 330, a user profile may be viewed and adjusted using a plurality of profile icons 364. The profile icon 365 opens a profile window where the user can make basic changes to his personal and financial profile. The configure icon 368 and the date icon 369 allow the user to set up his configure his portfolio and set the date. This ease of use helps the user to feel comfortable with the system and trusting of it, allowing him to take full advantage of the all the integrated features of the system.

A filtering field 363 is also shown in FIG. 11. Such filtering field 363 may include a plurality of companies and associated risk levels and industries which are displayed in accordance with the user's appropriate tolerance to risk and investment style. A risk/reward map 366 is also shown displaying the probability of the user reaching its financial goals. Also shown is a coaching window 371 for displaying coaching strings 370 based on a rule-based automated coaching engine. Such window 371 may include a field adjustment bar 372 in order to facilitate viewing of the coaching strings 370.

Further features associated with the graphical user interface for a portfolio modeling 182 include an information window 374 which illustrates various charts pertaining to sector diversification and other investment parameters. A portfolio model window 376 may also be displayed for portfolio modeling purposes. It should be noted that in one embodiment of the present invention, the various services provided by the present invention might be initiated by selecting corresponding service icons 377. The optimize icon 378 may optimize a securities list based on the newly specified criteria. The criteria icon 379 may enable the user to introduce additional criteria for selecting a particular security. The trade list 380 may display the system recommended securities that should be sold based on the user criteria and his personal financial parameters. The filter icon 381 may generate a filtered list of securities displayed in the filtered list window 363. Sort icon 382 may sort the list of securities based on a user selected criteria such as alphabetical order. The coaching icon 383 may generate context sensitive coaching related to the user's financial portfolio. The undo icon 385 can undo a specific securities swap. The submit icon 385 submits and the user changes to his portfolio during the current session.

The user can set a target goal for his investment portfolio as well as his preferences by selecting the target and preference icon 386. He may do an analysis on his past or present portfolio by selecting the portfolio analysis icon 388. He may trigger specific coaching on specific a security or group of securities or even on whole industry sectors, as well as request more detail information by selecting the stock analyst icon 390. He may further model and analyze the effect of inclusion or exclusion of particular securities on his portfolio by swapping stocks in and out of the portfolio 392.

When selecting a particular icon corresponding to the various tools, a corresponding help text string appears in the help screen 394, directing the user on how to use the particular tool.

The graphic user interface (GUI) of a computer system includes the interaction metaphors, images and concepts used to convey function and meaning on the computer screen, the detailed visual characteristics of every component of the graphic interface, and functional sequence of interactions over time that produce the characteristic "look and feel" of graphic interfaces.

The purpose of graphic user interface design is to provide screen displays that create an operating environment for the user, forming an explicit visual and functional context for the computer user's actions.

Successful user interfaces should be simple systems that do not require the user to learn and remember many rules and procedures. The present invention accomplishes this by providing an intuitively simple graphical user interface to present the financial model and its characteristics. The design implementation of the graphical user interface is not limited to any particular programming language and may be accomplished using any of the programming languages available such as C++, Visual Basic™, Pearl, or even HTML in combination with CGI. Such implementation is well within the scope of one skilled within the art.

The various embodiments described above are provided by way of illustration, only and should not be constructed to limit the invention. Those skilled in the art will readily recognize the various modifications and changes which may be made to the present invention without strictly following the exemplary embodiments illustrated and described herein, and without departing from the true spirit and scope of the present invention, which is set forth in the following claims.

What is claimed is:

1. A method for providing both live advice and automated coaching from a financial modeling system, comprising:
    receiving a user selection of one of a plurality of service levels, the service levels specifying combinations of portfolio modeling and automated coaching available to the user, the service levels including a selected amount of dialogue and instructions between the user and a live advisor;
    receiving a user selection of an icon specifying at least one of a plurality of methods for communication with a live advisor over a network, based on the selected service level;
    receiving a user specification of goals, the goals including revenue and expense goals;
    displaying, in a first window, an image of a live advisor providing live coaching determined by the selected service level and the specified goals;
    displaying, in a second window, context-sensitive automated coaching determined by the selected service level and the specified goals, the automated coaching being generated by a financial coaching system that comprises one or more coaching engines;
    receiving a user selection of a level of risk, by:
        receiving a user selection of one or more risk events from a list of risk events;
        based on actuarial data from at least one external database, displaying estimates of a probability and effect of an occurrence of the selected one or more risk events; and
        for a risk event among the selected one or more risk events, receiving a user specification of acceptance or rejection of an estimate associated with the risk event, and, if the user rejects the displayed estimate, receiving a user specification of a different estimate; and
    receiving user responses to the portfolio modeling, the automated coaching, and the live coaching of the selected service level,
    wherein the automated coaching incorporates the selected risk events, and
    wherein the received responses comprise modifications to the specified goals.

2. The method of claim 1 wherein the plurality of methods for communication includes at least two of:
    email, electronic chat, live streaming audio, voice over the network, telephone, still picture, streaming live video, or a collaborative interaction via a web page.

3. The method of claim 1 comprising displaying, in an interactive window, a financial model generated by the financial modeling system.

4. The method of claim 3 comprising displaying a plurality of function icons for receiving a user selection of operations on the generated financial model.

5. The method of claim 4 wherein the operations comprise at least one of:
    transact, monitor, model, explore, or track.

6. The method of claim 3 further comprises displaying, in at least one dynamic window, characteristics related to the generated financial model.

7. The method of claim 1 comprising displaying, in at least one interactive window, help messages related to using the financial modeling system.

8. The method of claim 1 comprising displaying at least one profile icon for receiving a user selection of operations on a user profile based on user information.

9. A system for providing information from a financial modeling system, the information including both live advice and automated coaching, comprising:
    a service level selector for receiving a user selection of one of a plurality of service levels, the service levels including combinations of portfolio modeling and automated coaching available to the user;
    an user interface generator, coupled to a network, for receiving a user selection of one of a plurality of communication icons specifying communication methods with a live advisor over the network based on the selected service level;
    an user communication interface for receiving goals from the user, the goals including revenue and expense goals;
    a display generator coupled to the network for displaying, in a first window, an image of the live advisor providing live coaching determined by the selected service level, and the goals;
    a display generator coupled to the network for displaying, in a second window, context-sensitive automated coaching determined by the selected service level, and the goals, wherein the automated coaching is driven by a financial coaching system that comprises one or more coaching engines;

a risk modeling simulator for providing user control of a level of risk supplied to the financial modeling system, by:

receiving a user selection of one or more risk events from a list of risk events;

based on actuarial data from at least one external database, displaying estimates of a probability and effect of an occurrence of the selected one or more risk events; and for a risk event among the selected one or more risk events, the receiving a user specification of acceptance or rejection of an estimate associated with the risk event, and, if the user rejects the displayed estimate, receiving a user specification of a different estimate;

an automated coaching engine coupled to a network for providing, in a second window context-sensitive automated coaching determined by the selected service level, and the goals;

a user communication-capturing component for receiving a user response to the portfolio modeling, the automated coaching, and the live coaching of the selected service level, wherein the automated coaching incorporates the selected risk events, and wherein the user response comprises modifications to the received goals.

10. The system of claim 9, wherein said network is the Internet.

11. The system of claim 9 wherein the communication methods include at least two of:

email, electronic chat, live streaming audio, voice over the network, telephone, still picture, streaming live video, or a collaborative interaction via a web page.

12. The system of claim 9 wherein the display generator further includes a second display generator generating at least one interactive window for displaying a financial model generated by the financial modeling system.

13. The system of claim 12 wherein the user interface generator further includes a function icon generator displaying a plurality of function icons for user selection of operations to be performed in the generated financial model.

14. The system of claim 13 wherein the operations include at least one of:

transact, monitor, model, explore, or track.

15. The system of claim 12 wherein the user interface generator further includes a third display generator for generating, at least one dynamic window for displaying characteristics related to the generated financial model.

16. The system of claim 9 wherein the user interface generator further includes a fourth display generator for generating at least one dynamic window for displaying help messages related to using the financial modeling system.

17. The system of claim 9 wherein the user interface generator further includes a second icon generator for receiving a user selection of operations on a user profile, based on user information.

18. A computer program embodied on a non-transitory computer-readable medium for providing information from a financial modeling system, the information including both live advice and automated coaching, the computer program comprising:

a code segment for receiving a user selection of one of a plurality of service levels, the service levels including combinations of portfolio modeling and automated coaching available to the user;

a code segment for receiving a user selection from a plurality of icons specifying methods for communicating with a live advisor over a network based on the selected service level;

a code segment for generating a user interface for receiving goals from the user, the goals including revenue and expense goals;

a code segment for displaying, in a first window, an image of the live advisor providing live coaching determined by the selected service level and the goals;

a code segment for displaying, in a second window, context-sensitive automated coaching determined by the selected service level and the goals, wherein the automated coaching is driven by a financial coaching system that comprises one or more coaching engines;

a code segment for providing a risk modeling component for receiving user control of the level of risk, by:

receiving a user selection of one or more risk events from a list of risk events;

based on actuarial data from at least one external database, displaying estimates of a probability and effect of an occurrence of the selected one or more risk events; and for a risk event among the selected one or more risk events, the receiving a user specification of acceptance or rejection of an estimate associated with the risk event, and, if the user rejects the displayed estimate, receiving a user specification of a different estimate; and a code segment for providing a communication component for receiving a user response to the portfolio modeling, the automated coaching, and the live coaching of the selected service level, wherein the automated coaching incorporates the selected risk events, and wherein the user response comprises modifications to the received goals.

19. The computer program of claim 18 wherein the plurality of methods for communication includes at least two of:

email, electronic chat, live streaming audio, voice over the network, telephone, still picture, streaming live video, or a collaborative interaction via a web page.

20. The computer program of claim 18 wherein the code segment for generating a user interface further includes:

a code segment for generating at least one interactive window for displaying a financial model generated by the financial modeling system.

21. The computer program of claim 20 wherein the code segment for generating a user interface further includes:

a code segment for displaying a plurality of function icons for user selection of operations to be performed in the generated financial model.

22. The computer program medium of claim 21 wherein the operations include at least one of:

transact, monitor, model, explore, or track.

23. The computer program of claim 20 wherein the code segment for generating a user interface further includes:

a code segment for generating at least one dynamic window for displaying characteristics related to the generated financial model.

24. The computer program of claim 18 wherein the code segment for generating a user interface further includes:

code segment for generating at least one dynamic window for displaying help messages related to using the financial modeling system.

25. The computer program of claim 18 wherein the code segment for generating a user interface further includes:
a code segment for providing at least one profile icon for receiving a user selection of operations on a user profile based on user information.

26. A method for providing both live advice and automated coaching from a financial modeling and counseling system, comprising:
receiving a profile of a user;
receiving a user selection of one of a plurality of service levels, the service levels specifying combinations of financial modeling and automated coaching available to the user, the service levels including a selected amount of dialogue and instructions between the user and a live advisor;
receiving a user selection of one or more risk events from a list of risk events;
displaying, in a first window, an image of the live advisor providing live coaching determined by the selected service level and the profile of the user;
displaying, in a second window, context-sensitive automated coaching determined by the selected service level and the profile of the user, the automated coaching including suggestions for changes to a current financial portfolio of the user;
receiving user responses to the financial modeling, the automated coaching, and the live coaching of the selected service level;
wherein the automated coaching incorporates the selected risk events, and
wherein the received responses comprise modifications to the profile of the user.

27. A method for providing both live advice and automated coaching from a financial modeling and counseling system, comprising:
receiving a user selection of one of a plurality of service levels, the service levels specifying combinations of financial modeling and automated coaching available to the user, the service levels including a selected amount of dialogue and instructions between the user and a live advisor;
negotiating fees to be charged to the user based upon estimated profitability associated with the service level selected by the user, the fees being negotiated prior to providing service to the user;
receiving a user selection of one or more risk events from a list of risk events;
displaying, in a first window, an image of the live advisor providing live coaching determined by the selected service level and the profile of the user;
displaying, in a second window, context-sensitive automated coaching determined by the selected service level and the profile of the user, the automated coaching including suggestions for changes to a current financial portfolio of the user;
receiving user responses to the financial modeling, the automated coaching, and the live coaching of the selected service level; and
wherein the automated coaching incorporates the selected risk events.

* * * * *